US012372076B2

(12) United States Patent
Tomas et al.

(10) Patent No.: US 12,372,076 B2
(45) Date of Patent: Jul. 29, 2025

(54) VARIABLE SPLIT DISPLACEMENT RATIO AXIAL PISTON MACHINES

(71) Applicant: University of Manitoba, Winnipeg (CA)

(72) Inventors: Zeljko Tomas, Winnipeg (CA); Nariman Sepehri, Winnipeg (CA)

(73) Assignee: University of Manitoba, Winnipeg (CA)

( * ) Notice: Subject to any disclaimer, the term of this patent is extended or adjusted under 35 U.S.C. 154(b) by 134 days.

(21) Appl. No.: 18/330,592

(22) Filed: Jun. 7, 2023

(65) Prior Publication Data

US 2024/0068456 A1 Feb. 29, 2024

Related U.S. Application Data

(60) Provisional application No. 63/400,940, filed on Aug. 25, 2022.

(51) Int. Cl.
*F04B 1/22* (2006.01)
*F04B 1/324* (2020.01)
(Continued)

(52) U.S. Cl.
CPC ................ *F04B 1/22* (2013.01); *F04B 1/324* (2013.01); *F04B 17/03* (2013.01); *F15B 15/18* (2013.01)

(58) Field of Classification Search
CPC .......... F04B 1/16; F04B 1/22–24; F04B 1/29; F04B 1/295; F04B 1/324; F04B 17/03;
(Continued)

(56) References Cited

U.S. PATENT DOCUMENTS 2,940,397 A * 6/1960 Mattos ...................... F04B 1/16 91/506
3,183,845 A * 5/1965 Tyler ......................... F04B 1/22 91/472
(Continued)

FOREIGN PATENT DOCUMENTS

FR 548233 A * 1/1923
WO WO-9212357 A1 * 7/1992 .............. F04C 14/20
(Continued)

OTHER PUBLICATIONS

Quan et al; "Output Characteristics of a Series Three-port Axial Piston Pump", in Chinese Journal of Mechanical Engineering, May 2012, DOI:10.3901/CJME 2012.03.498, vol. 25, No. 3, 2012 pp. 498-505.
(Continued)

*Primary Examiner* — Thomas Fink
(74) *Attorney, Agent, or Firm* — Kyle R Satterthwaite; Ryan W Dupuis; Ade & Company Inc.

(57) ABSTRACT

A variable split displacement ratio axial piston machine, featuring a rotatable driveshaft, a tapered swashplate disposed around said rotatable driveshaft, a first working section disposed on a first side of the tapered swashplate, and a second working section disposed on a second side of the tapered swashplate. Each working section includes a respective set of pistons slidably received in a respective set of cylinder bores to draw and expel fluid into and from said cylinder bores. The first and second working sections respectively interface with first and second outer faces of the tapered swashplate in respective first and second facial planes. Tiltable adjustment of a working position of the tapered swashplate is operable to adjust respective orientations of the facial planes, which dictate relative piston stroke lengths of the piston sets. Such tiltable adjustment imparts
(Continued)

control over a variable split displacement ratio between the working sections.

16 Claims, 10 Drawing Sheets

(51) Int. Cl.
*F04B 17/03* (2006.01)
*F15B 15/18* (2006.01)

(58) Field of Classification Search
CPC ...................... F01B 3/106; F01B 3/007; F01B 3/0035–0038; F16D 31/02; F15B 15/18
USPC ........................... 92/13; 91/499–507; 60/492
See application file for complete search history.

(56) References Cited

U.S. PATENT DOCUMENTS

| | | | | |
|---|---|---|---|---|
| 5,141,402 A * | 8/1992 | Bloomquist | H02K 17/30 417/217 |
| 5,269,142 A * | 12/1993 | Atake | F16H 48/18 60/485 |
| 5,486,142 A * | 1/1996 | Folsom | F16H 39/10 474/69 |
| 5,531,072 A * | 7/1996 | Larkin | F16H 39/10 60/491 |
| 5,540,048 A * | 7/1996 | Larkin | F16H 61/431 91/415 |
| 7,731,485 B2 | 6/2010 | Achten | |

FOREIGN PATENT DOCUMENTS

| | | | |
|---|---|---|---|
| WO | WO-9631715 A1 * | 10/1996 | F16H 39/10 |
| WO | WO-9714896 A1 * | 4/1997 | F16H 39/10 |
| WO | WO-9849466 A1 * | 11/1998 | F16H 39/10 |
| WO | WO-9849468 A1 * | 11/1998 | F16H 39/10 |

OTHER PUBLICATIONS

Quan et al."Performance of Speed Variable Asymmetric Pump Controlled Asymmetric Hydraulic Cylinder", The 10th JFPS International Symposium on Fluid Power 2017, Oct. 24-27, 2017.

Zhang et al. "Control and Performance Analysis of Variable Speed Pump-Controlled Asymmetric Cylinder Systems under Four-Quadrant Operation", Actuators 2020, 9, 123, pp. 1-18.

* cited by examiner

VARIABLE SPLIT DISPLACEMENT RATIO AXIAL PISTON MACHINES

CROSS-REFERENCE TO RELATED APPLICATIONS

This application claims benefit under 35 U.S.C. 119(e) of U.S. Provisional Application No. 63/400,940, filed Aug. 25, 2022, the entirety of which is incorporated herein by reference.

FIELD OF THE INVENTION

This application relates generally to axial piston machines, and more particularly to pumps for driving single rod hydraulic cylinders in closed loop hydraulic circuits.

BACKGROUND

Demand for more efficient hydraulic systems has previously led to numerous research projects in which a single rod hydraulic cylinder is hydraulically connected to a bi-directional fixed displacement pump connected to an electric (servo) motor as a prime mover. By avoiding the use of hydraulic directional/throttling valves, the combination is very efficient, but at the same time, challenges remain from the perspective of design simplicity and operational stability. The problem with this combination arises from the fact that the oil volumes at the rod side and cap side of the cylinder are different; thus, there has to be some way to compensate the difference. This difference can be expressed by way of a cylinder area ratio, meaning the ratio of the full cross-sectional area of the cylinder bore minus the cross-sectional area of the piston rod. So far, the most common way to deal with this problem has been to employ a hydraulic circuit, between the hydraulic cylinder and the pump, to redirect compensatory flows as needed. This arrangement may require some combination of valves, possibly in combination with accompanying electronic and software control componentry.

Another approach has been to design a special three-port pump, also known as an “asymmetric pump”. To date, there have been two approaches for such three-port pump design. One design approach is to modify the pump valve plate to have three ports. The second design approach is to modify the rotating barrel/valve plate to make every other piston to discharge into a different port. In either approach, there is typically one common suction port and, two pressure ports with identical flow. The common port is connected to the cap side of the hydraulic cylinder, the second port is connected to the rod end of the hydraulic cylinder, and the third port is connected to the drain. The biggest obstacle in such designs is that the actuator and the pump must be a perfect match for one another in terms of displacement ratios. In other words, to achieve best efficiency, the pump has to be specifically built for a certain hydraulic cylinder, or vice versa.

In view of the foregoing, there remains a need for improved pump designs suitable for use with single rod hydraulic cylinders.

SUMMARY OF THE INVENTION

According to one aspect of the invention, there is provided a variable split displacement ratio axial piston machine comprising:

a rotatable driveshaft supported for rotation about a longitudinal axis thereof that lies axially of the machine;

a tapered swashplate disposed around said rotatable driveshaft, said tapered swashplate having first and second outer faces that face in axially opposing directions along the longitudinal axis in facial planes of non-parallel relation to one another that are separated by an acutely oblique taper angle measured between said first and second outer faces, the tapered swashplate being adjustably tiltable into different working positions of varying orientation relative to the longitudinal axis of the rotatable driveshaft;

a first working section that is disposed on a first side of the tapered swashplate of corresponding relation to said first outer face thereof, and comprises a first set of pistons slidably received in a first set of cylinder bores in which said first set of pistons are displaceable back and forth to draw and expel fluid into and from said first set of cylinder bores;

a second working section disposed on a second side of the tapered swashplate of corresponding relation to said second outer face thereof, and comprising a second set of pistons slidably received in a second set of cylinder bores in which said second set of pistons are displaceable back and forth to draw and expel fluid into and from said first second of cylinder bores;

wherein the first and second working sections respectively interface with the first and second outer faces of the tapered swashplate in respective first and second facial planes, and tiltable adjustment of the working position of the tapered swashplate is operable to adjust respective orientations of the first and second facial planes, said orientations of which dictate relative piston stroke lengths of the first and second piston sets, and thereby sets a variable split displacement ratio between said first and second working sections.

BRIEF DESCRIPTION OF THE DRAWINGS

One preferred embodiment of the invention will now be described in conjunction with the accompanying drawings in which.

DETAILED DESCRIPTION

Figure 1A:
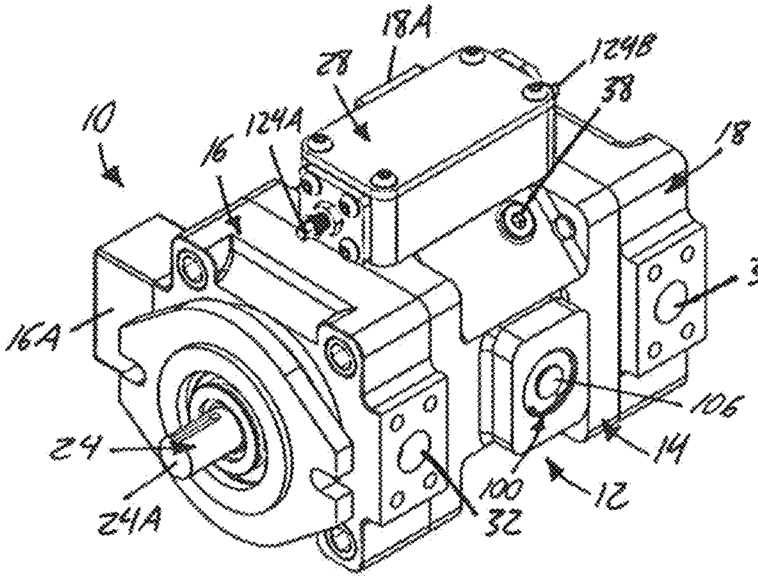
FIG. 1A is a top front perspective view of a variable split displacement ratio axial piston pump of the present invention.
Figure 1B:
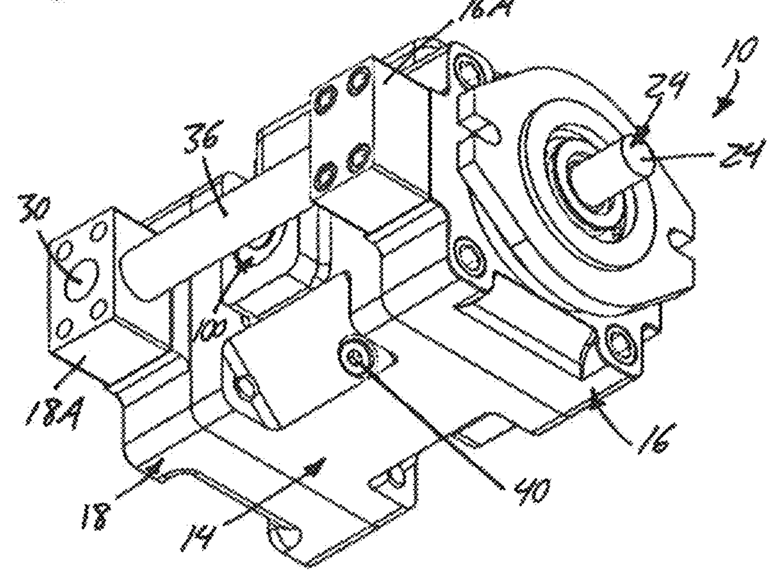
FIG. 1B is a bottom front perspective view of the pump.

Disclosed below in enabling detail is a variable split displacement ratio axial piston pump of the present invention. In brief, the pump features a tapered swashplate disposed around a rotatable driveshaft is shared between a pair of working sections, and is adjustably tiltable into different working positions of varying orientation relative to a longitudinal axis of the driveshaft in order to vary the relative piston stroke length between front and rear working sections that share the tapered swashplate between them. The pump has three flow ports by which fluid can enter and exit the pump: a shared common port fluidly communicated with both working sections at matching halves of their pumping cycles, and two unshared ports each communicating with only a respective one of the two working sections at the other half of its pumping cycle. Tilted adjustment of the tapered swashplate into different working positions is operable to adjust a variably split displacement ratio between the two working sections.

FIGS. 1A-1C, 2A-2D and 3A-3B show a fully assembled example of the pump according to one preferred, but non-limiting, embodiment of the present invention. The pump 10 features a three-part main housing 12 comprised of a mid-housing 14, a front housing 16 that caps off a front end 14A of the mid-housing 14, and a rear housing 18 that caps of an axially opposing rear end 14*b* of the mid-housing 14. The mid-housing 14 contains the tapered swashplate 20, and the bulk of the two working sections 22A, 22B that share this tapered swashplate 20 between them. The front and rear housings 16, 18 cap off the mid-housing 14 to constrain the componentry of the two working sections within the interior space of the mid-housing 14, and also contain the necessary bearings to rotatably support a common driveshaft 24 that axially traverses the interior space of the mid-housing on a longitudinal axis 26. This driveshaft 24 is shared by the two working sections to drive revolution of respective piston-cylinder sets thereof around said longitudinal axis 26. The driveshaft 24 penetrates axially through the front housing 16 so that a keyed front end 24A resides externally of the main housing 12 for coupling to a bidirectional drive motor 150 (shown schematically in FIGS. 12 & 13) by which the driveshaft 24 is rotationally driveable in two opposing directions for bi-rotational operation of the pump 10.

Still referring to FIGS. 1A-1C, 2A-2D and 3A-3B, aside from the main housing 12 and externally protruding front end 24A of the driveshaft, other externally visible components on the pump 10 include a control housing 28 mounted externally atop the mid-housing 14 to partially housing a control assembly for setting the tilt-adjustable working angle of the tapered swashplate 20, a common first flow port 30 shared by the two working sections 22A, 22B, an unshared second flow port 32 belonging solely to the front working section 22A, and an unshared third flow port 34 belonging solely to the rear working section. In the illustrated embodiment, the shared common first port 30 is provided on a bumped-out shoulder block 16A of the front housing 16 for direct fluid communication with the front working section 22A through the front housing 16, and is fluidly communicated with the rear working section 22B via an externally piped conduit 36 that runs axially and externally alongside the mid-housing 14 from the bumped out shoulder block 16A of the front housing 16 to a matching bumped-out shoulder block 18A of the rear housing.

Figure 1C:
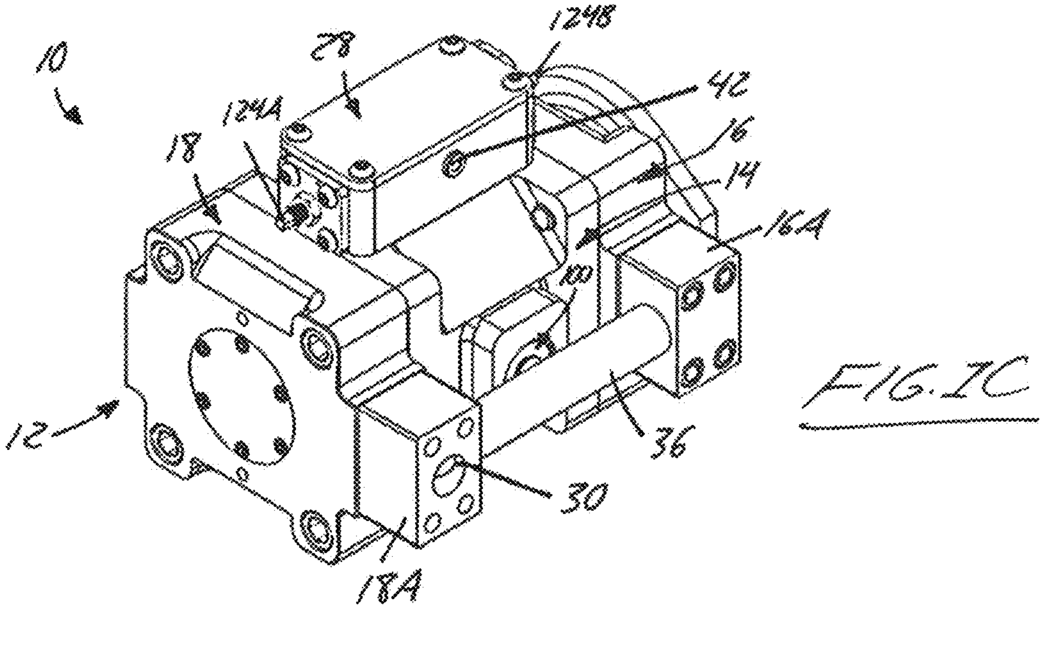
FIG. 1C is a top rear perspective view of the novel pump.
Figure 2A:
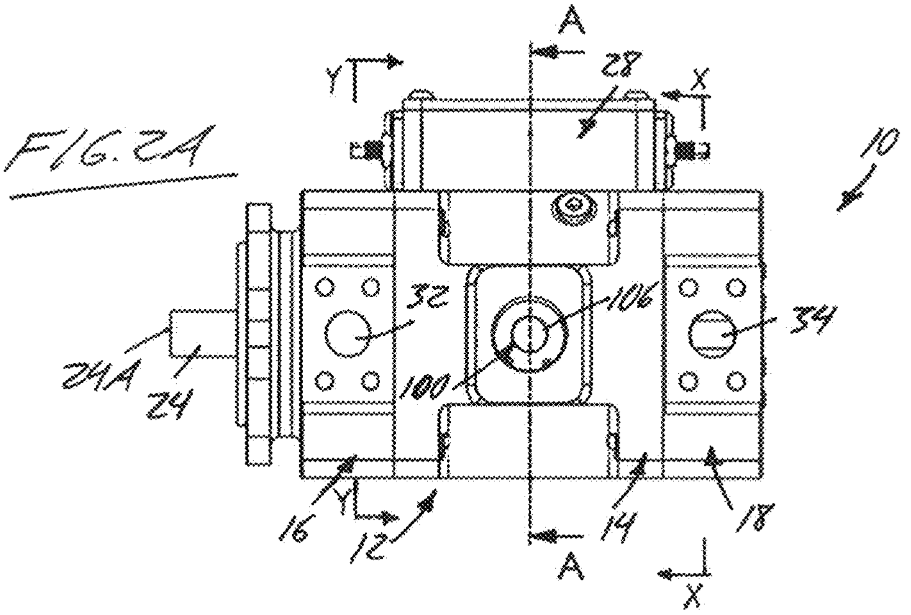
FIG. 2A is an elevational side view of the novel pump.
Figure 2B:
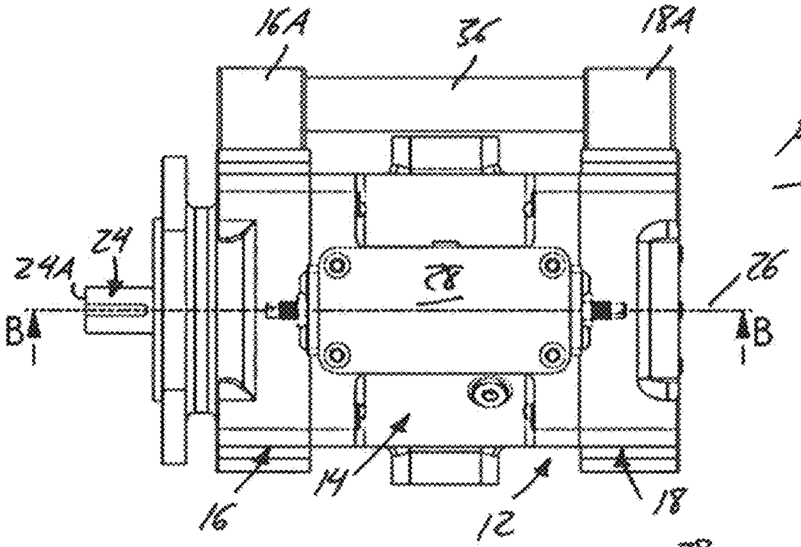
FIG. 2B is a top plan view of the novel pump.
Figure 2C:
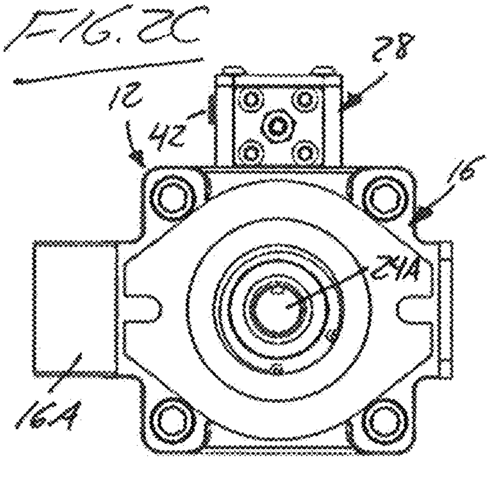
FIG. 2C is a front elevational view of the novel pump.
Figure 2D:
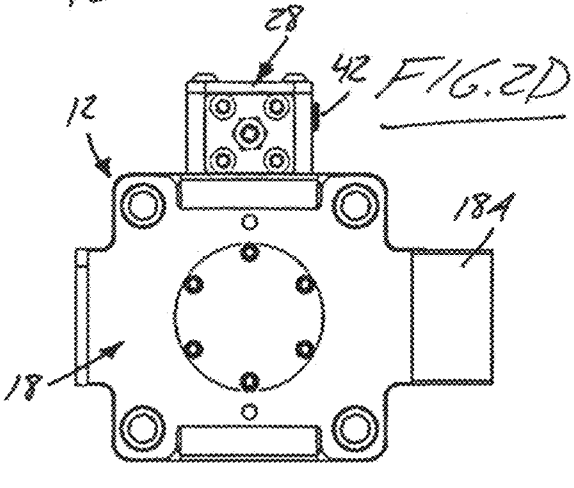
FIG. 2D is a rear elevational view of the novel bump.
Figure 3A:
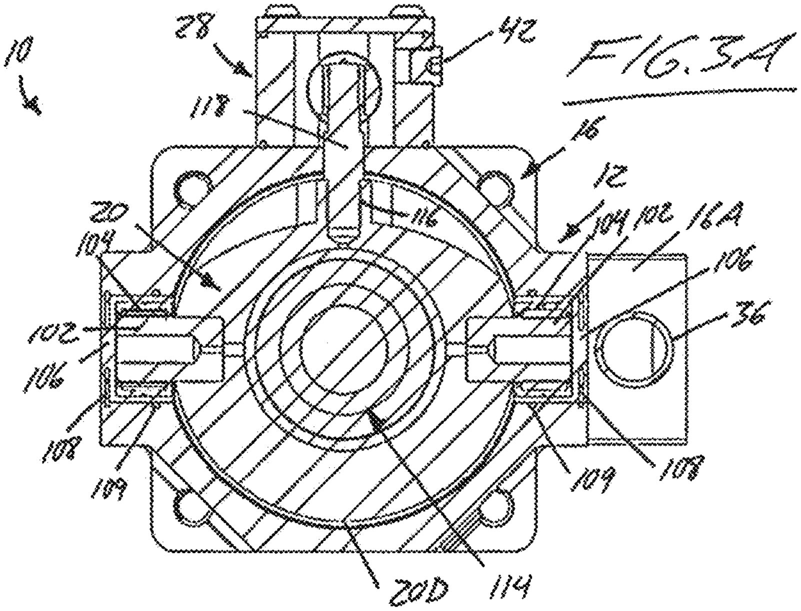
FIG. 3A is a cross-sectional view of the novel pump, as viewed along line A-A of FIG. 2A.
Figure 3B:
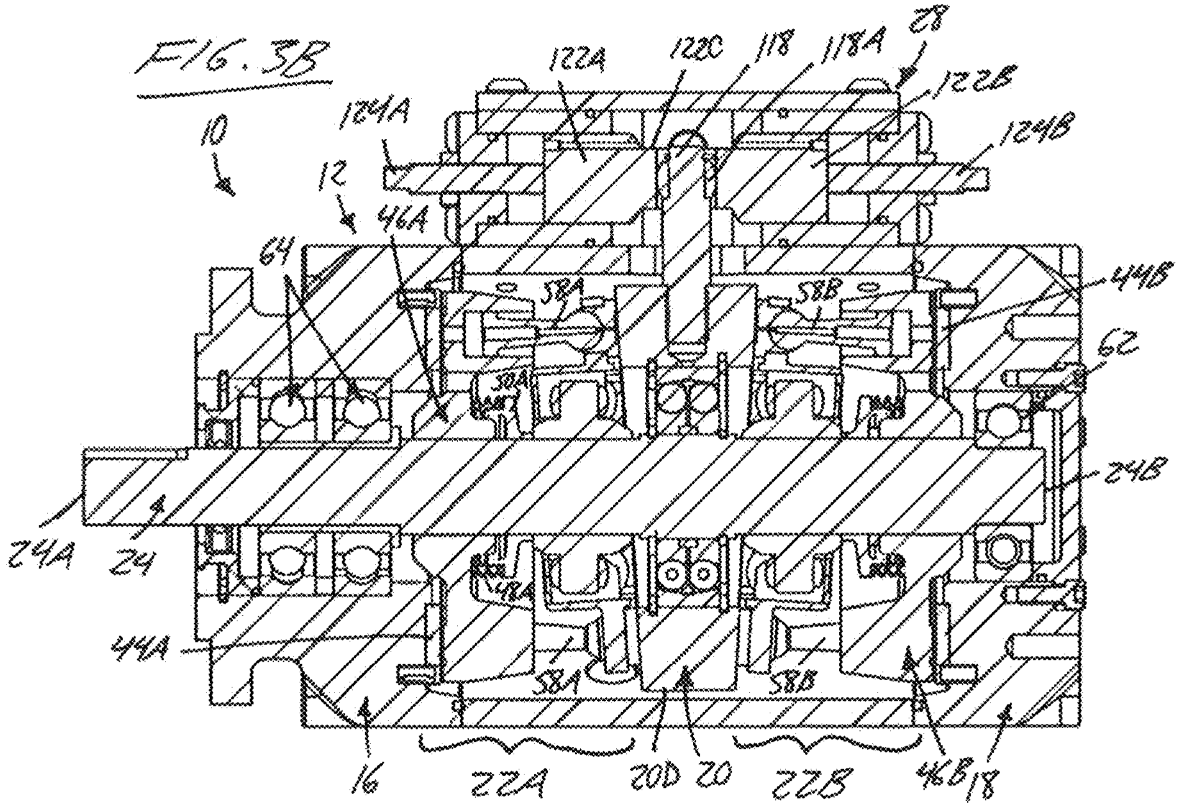
FIG. 3B is a cross-sectional view of the novel pump, as viewed along line B-B of FIG. 2B.

The three flow ports 30, 32, 34 are where fluid is admitted to and discharged from the working sections 22A, 22B during working operation of the pump 10, and so in a closed loop hydraulic circuit for controlling a hydraulic cylinder, two of these three flow ports are fluidly connected to the cap and piston ends of a hydraulic cylinder, with a third of these flow ports connected to a charge or boost line of the circuit, as detailed herein further below with reference to FIGS. 12 and 13. Additional drain ports of the illustrated embodiment include an upper drain port 38 at the topside of the mid-housing 14 and beside the control housing 28 (FIG. 1A), a lower drain port 40 at an underside of the mid-housing 14 (FIG. 1B), and a control fluid drain port 42 provided in a wall of the control housing 28 (FIG. 1C).

Turning to the internal components of the pump, attention is first drawn to the design of the tapered swashplate 20 that is shared between the two working sections. The tapered swashplate 20, visible in FIGS. 4A-4C, 5 and 6C-9B, forms a closed ring spanning around the rotatable driveshaft 24, has a flat annular front face 20A that faces toward the front end of the pump, and a flat annular rear face 20B that faces toward the opposing rear end of the pump. The planes in which these flat front and rear annular faces 20A, 20B reside are referred to herein as front and rear facial planes $P_F$, $P_R$ in order to provide distinction thereof over any other reference planes referred to herein. The facial planes are of non-parallel relation to one another, and more specifically are separated by an acutely oblique taper angle $\alpha$ that is measured between the front and rear annular faces 20A, 20B, and is uniform throughout the full surface area of each annular face 20A, 20B. In the illustrated embodiment, this taper angle measures 7-degrees, though this angle may vary in other embodiments.

A bisecting midplane $P_M$ of the tapered swashplate 20 lies centrally between the two facial planes at an equal angle to each thereof. In the illustrated example of a 7-degree taper angle, this equal angle from the bisecting midplane to each of the facial planes is 3.5-degrees. The thickness $T_S$ of the swashplate, referring to the dimension thereof measured between the annular faces 20A, 20B, tapers along a singular diametric axis of the swashplate's midplane, from a widest point at or adjacent one end of such diametric axis, to a narrowest point at or adjacent an opposing end thereof. In the illustrated example, this diametric axis along which the swashplate is tapered runs from a twelve o'clock position centered over the driveshaft 24 on a top half of the swashplate 20, to a six o'clock position centered beneath the driveshaft 24 on a bottom half of the swashplate 20. The thickness of the illustrated swashplate is thus tapered in a height direction, and is thickest at the top end 20C of the swashplate and thinnest at the diametrically opposing bottom end 20D thereof. It will be appreciated however that the taper direction denoted by the particular orientation of the diametric axis may be varied in other instances, provided the placement an orientation of other swashplate depending components and features are adjusted accordingly to maintain the various functional relationships described herein between the swashplate and such cooperating components and features. This diametric axis along which the swashplate thickness $T_S$ is tapered may also be referred herein simply as the "taper axis" for short.

Figure 6A:
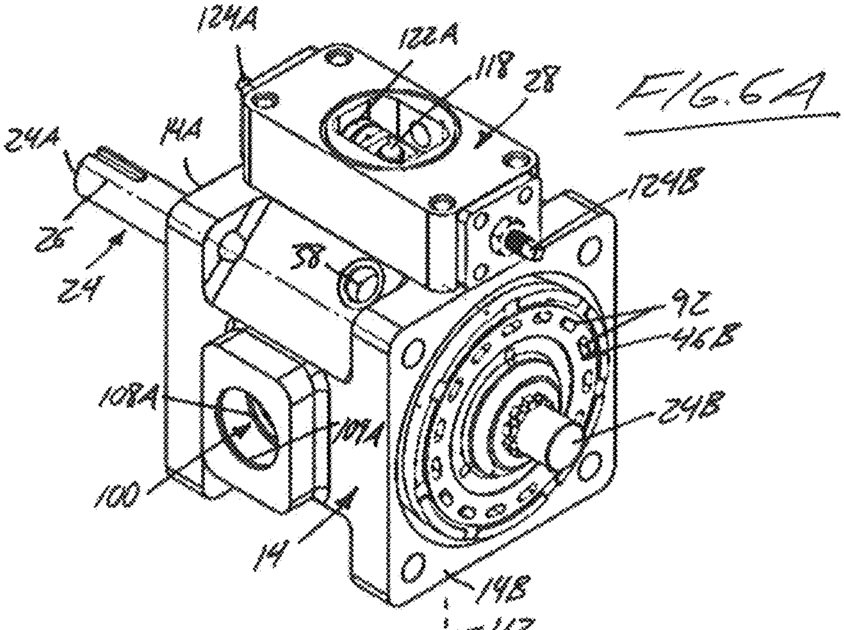
FIG. 6A is a rear perspective view of the mid-housing, the control assembly and a bulk of the rear working section of FIGS. 4A through 4C once installed together with the swashplate and part of the front pumping assembly.
Figure 6B:
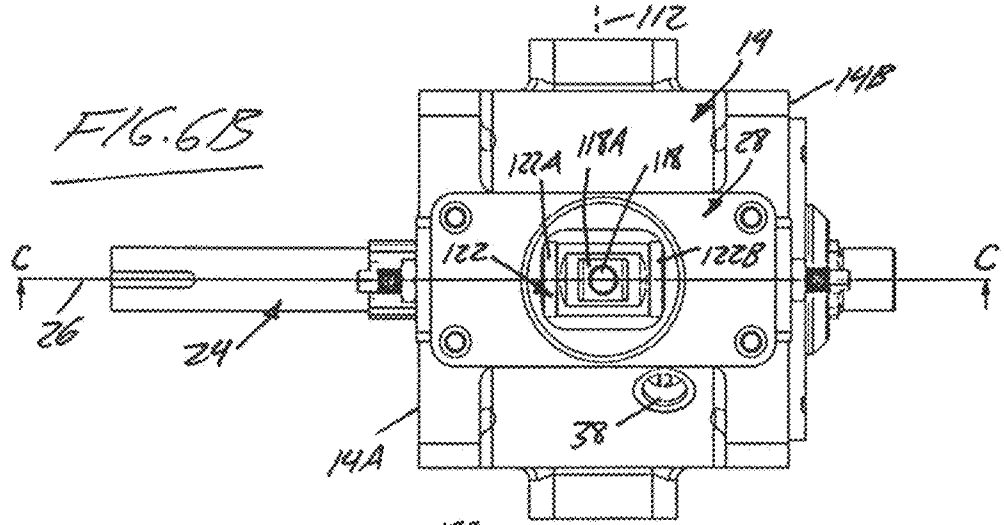
FIG. 6B is a top plan view of the assembled components of FIG. 6A, with the tapered swashplate in a non-tilted center position providing an evenly split displacement ratio between the two working sections.
Figure 6C:
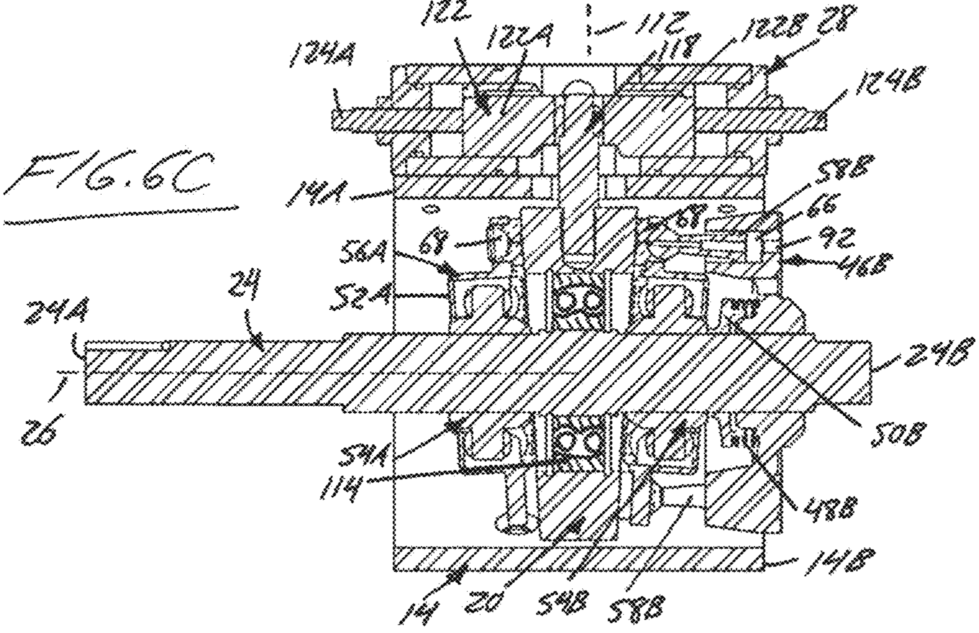
FIG. 6C is a cross-sectional view of the assembled components of FIG. 6B as viewed along line C-C thereof.
Figure 6D:
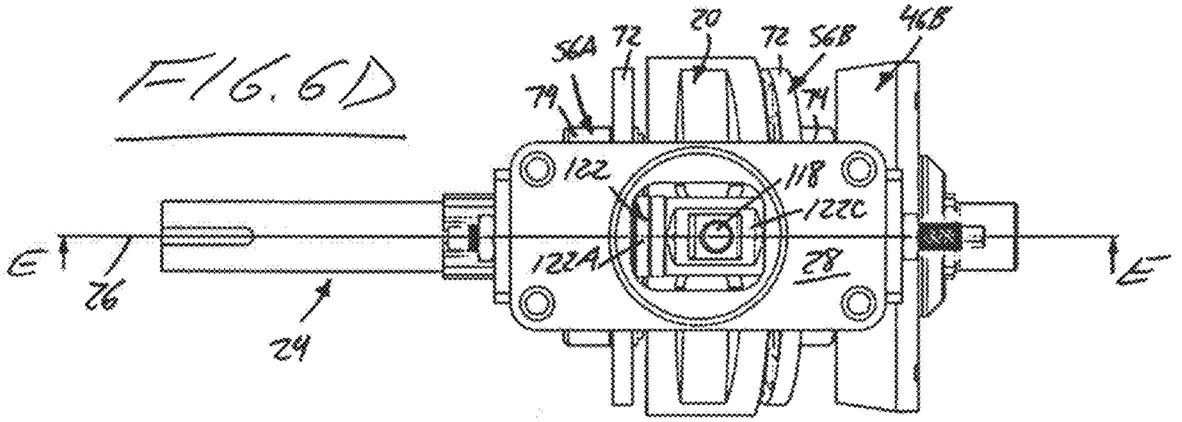
FIG. 6D is a top plan view of same the assembled components of FIGS. 6A to 6C, but with the swashplate in a fully rear-tilted position operable to changing the split displacement ratio in a manner maximizing the displacement of the rear working section and minimizing the displacement of the front working section.
Figure 7A:
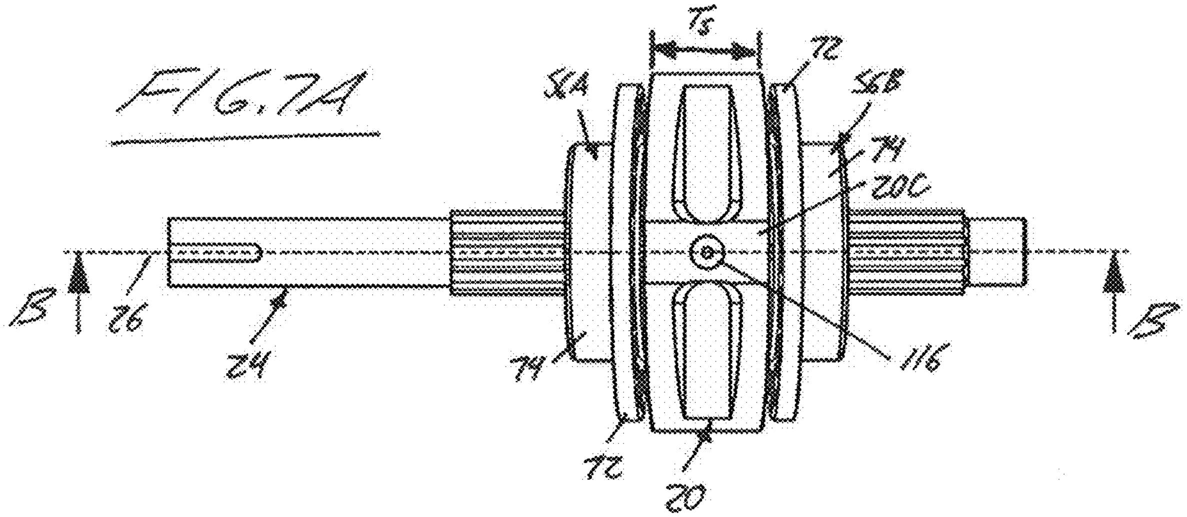
FIG. 7A is an isolated top plan view of the centrally shared swashplate of the pump installed on a rotatable driveshaft of the pump, together with respective piston holders of the front rear working sections, with the swashplate in its non-tilted center position providing the evenly split displacement ratio between the two working sections.
Figure 7B:
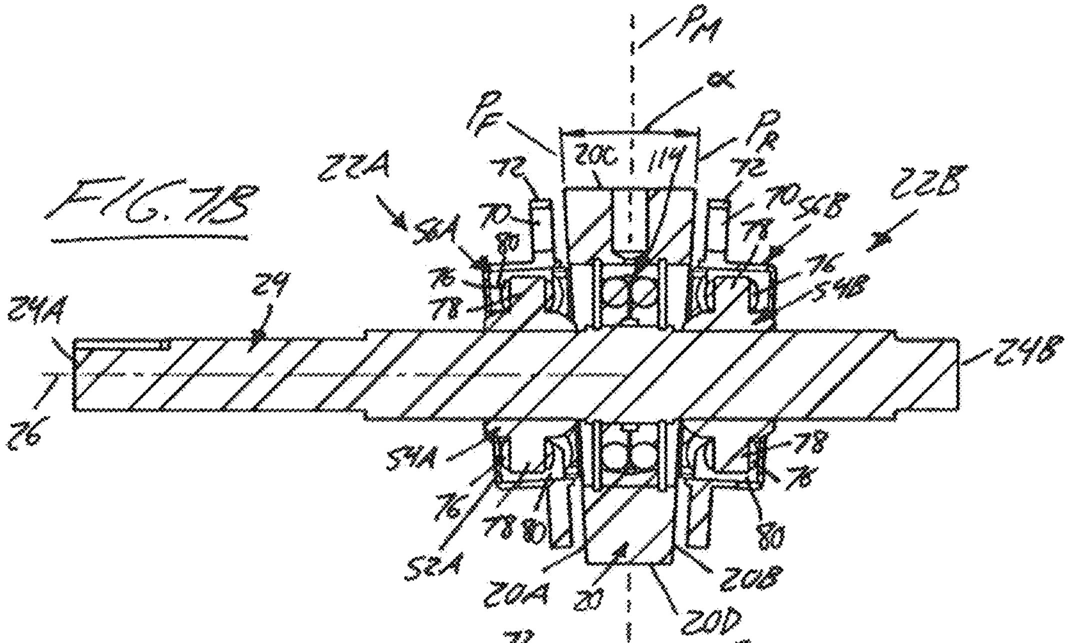
FIG. 7B is an isolated cross-sectional view of the swashplate, driveshaft and piston holders of FIG. 7A as viewed along line B-B thereof.

The bisecting midplane $P_M$ serves as a reference plane by which to describe an adjustable tilt angle of the tapered swashplate 20 relative to the longitudinal axis 26 of the driveshaft 24. Variation of this adjustable tilt angle within a permitted range of tilt adjustment denotes repositioning of the tapered swashplate 20 among a permitted range of different possible working positions, each of which results in a uniquely different split displacement ratio between the two working sections, as explained in more detail further below. FIGS. 6C, 7A and 7B illustrate a central non-tilted working position of the tapered swashplate 20, where the swashplate's bisecting midplane $P_M$ lies perpendicularly of the driveshaft's longitudinal axis 26. In this central non-tilted working position, the facial planes of both annular faces 20A, 20B of the tapered swashplate 20 lie obliquely of the longitudinal axis 26 of the driveshaft 24 at equal relative angles thereto. As explained in more detail further below, this central non-tilted working position of the tapered swashplate 20 sets the split displacement ratio between the front and rear working sections at even 50:50.

Figure 6E:
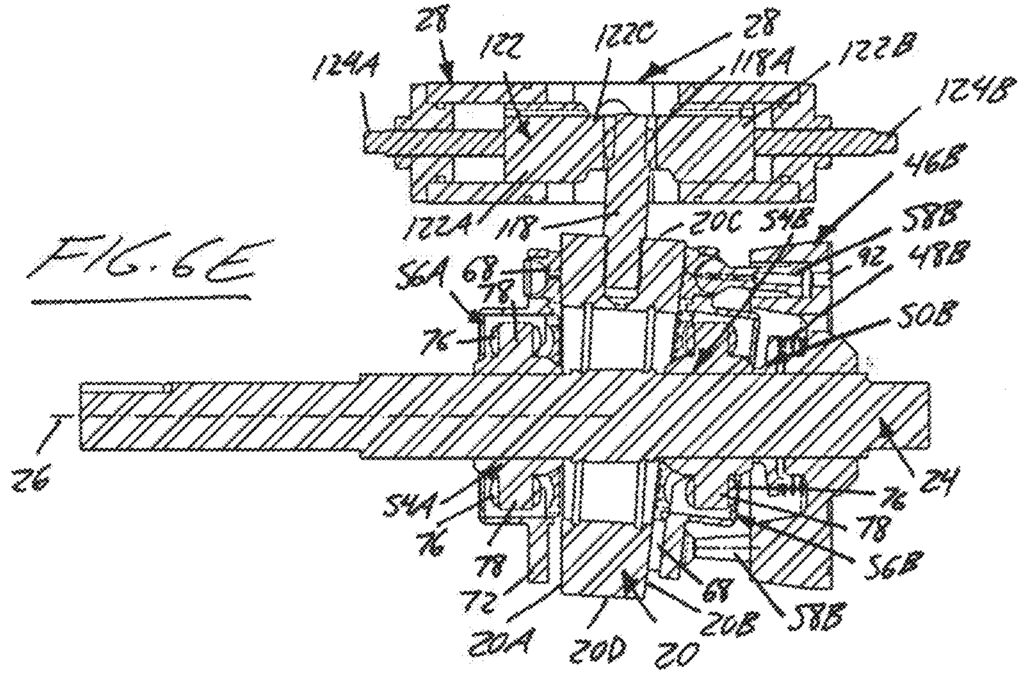
FIG. 6E is a cross-sectional view of the assembled components of FIG. 6D as viewed along line E-E thereof.
Figure 8A:
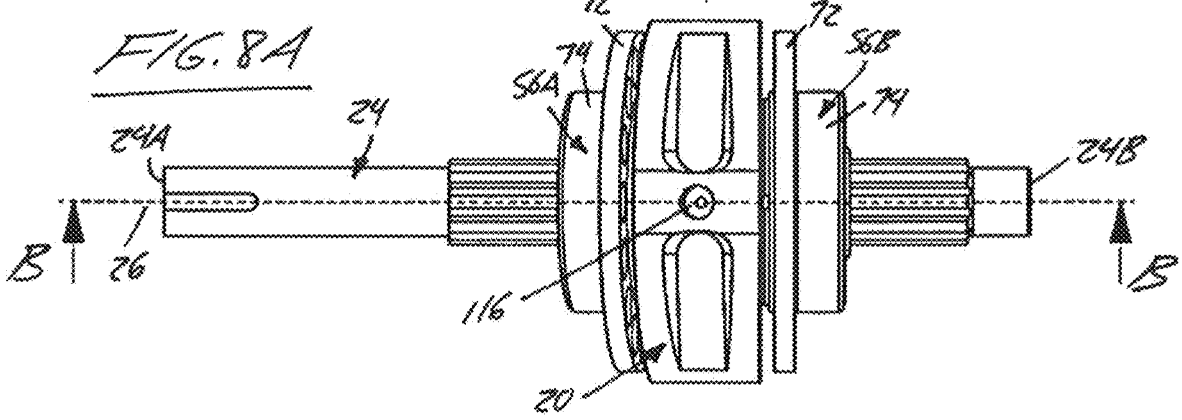
FIG. 8A is another isolated top plan view of the swashplate, driveshaft and piston holders of FIG. 7A, but with the swashplate in a fully front-tilted position maximizing the displacement of the front working section and minimizing the displacement of the rear working section.
Figure 8B:
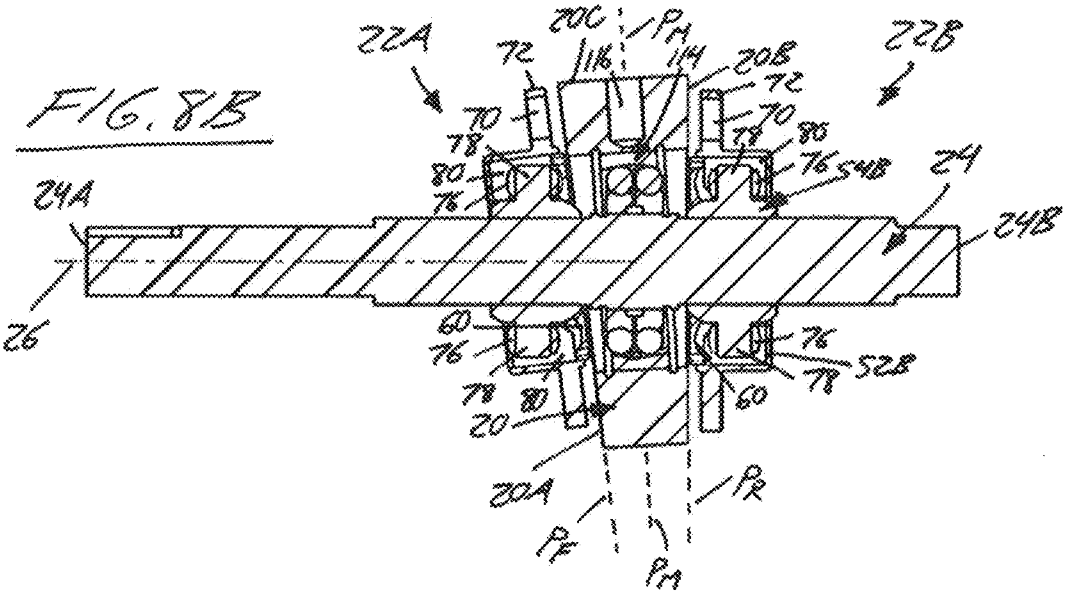
FIG. 8B is an isolated cross-sectional view of the swashplate, driveshaft and piston holders of FIG. 8A as viewed along line B-B thereof.
Figure 9A:
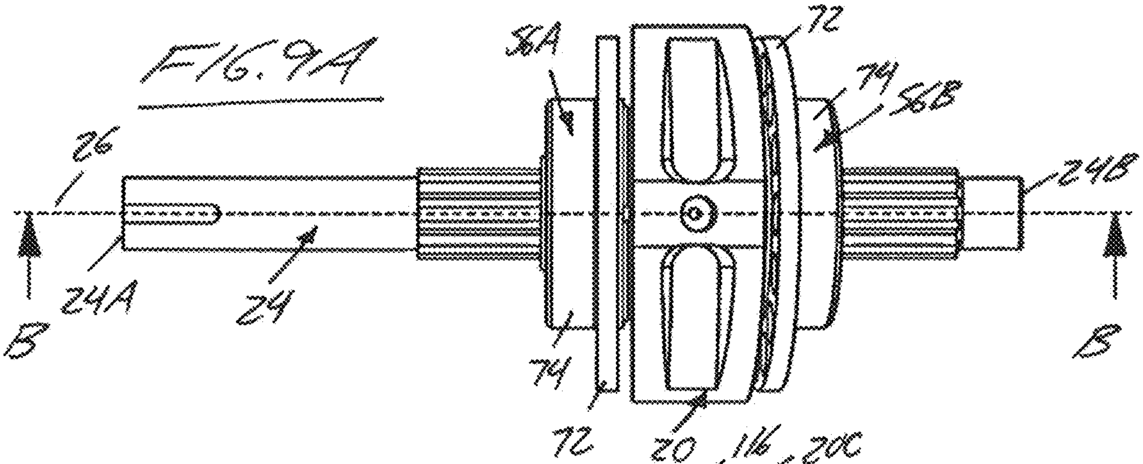
FIG. 9A is another isolated top plan view of the swashplate, driveshaft and piston holders of FIG. 7A, but with the swashplate in the fully rear-tilted position maximizing the displacement of the rear working section and minimizing the displacement of the front working section.
Figure 9B:
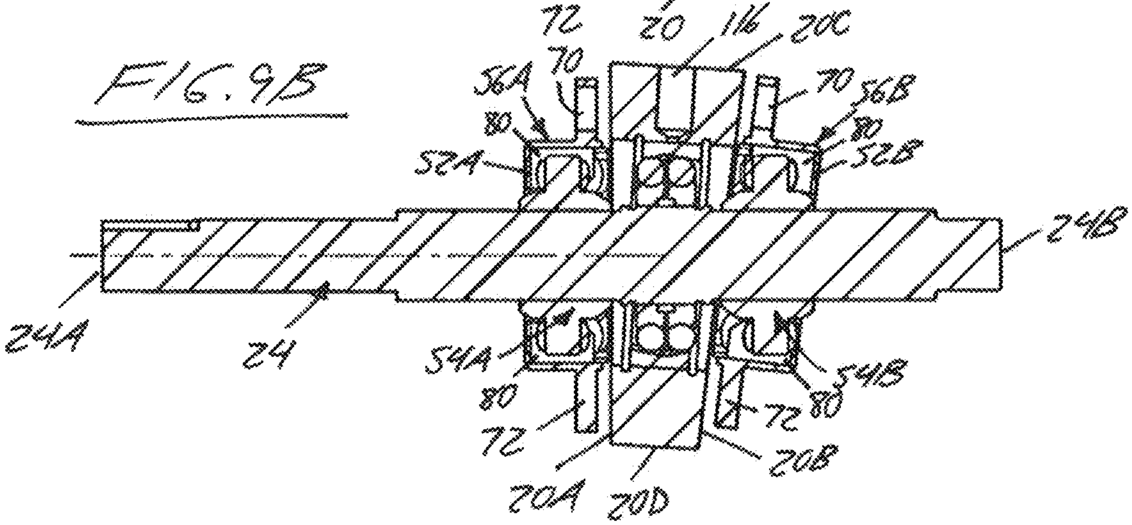
FIG. 9B is an isolated cross-sectional view of the swashplate, driveshaft and piston holders of FIG. 9A as viewed along line B-B thereof.

In contrast, FIGS. 6E, 9A and 9B illustrate a fully rear-tilted working position of the tapered swashplate 20, where the wider (top) end 20C of the swashplate has been tilted toward the rear end of the pump's main housing to a tilt angle at which the facial plane $P_F$ of the swashplate's front annular face 20A lies orthogonally of the driveshaft's longitudinal axis 26. This fully rear-tilted working position of the tapered swashplate 20 sets the split displacement ratio of the front working section to the rear working section at 0:100. Variation of the tilt angle of the tapered swashplate 20 among different intermediate positions between the central non-tilted working position and the fully rear-tilted working position thus enables variation of the split displacement ratio to various values between 50:50 and 100:0 (rear to front). FIGS. 8A and 8B similarly illustrate a fully front-tilted working position of the tapered swashplate 20, where the wider (top) end 20C of the swashplate 20 has been tilted toward the front end of the pump's main housing to a tilt angle at which the rear face 20B of the swashplate 20 lies orthogonally of the driveshaft's longitudinal axis 26. This fully front-tilted working position of the tapered swashplate 20 sets the split displacement ratio of the front pumping to the rear working section at 100:0. Variation of the tilt angle of the tapered swashplate among different intermediate positions between the central non-tilted working position and the fully front-tilted working position thus enables variation of the split displacement ratio to various values between 50:50 and 100:0 (front to rear). Between the forward and rearward tiltability of the tapered swashplate 20, the split displacement ratio between the front and rear working sections can therefore be varied anywhere between 100:0 and 0:100.

Figure 4A:
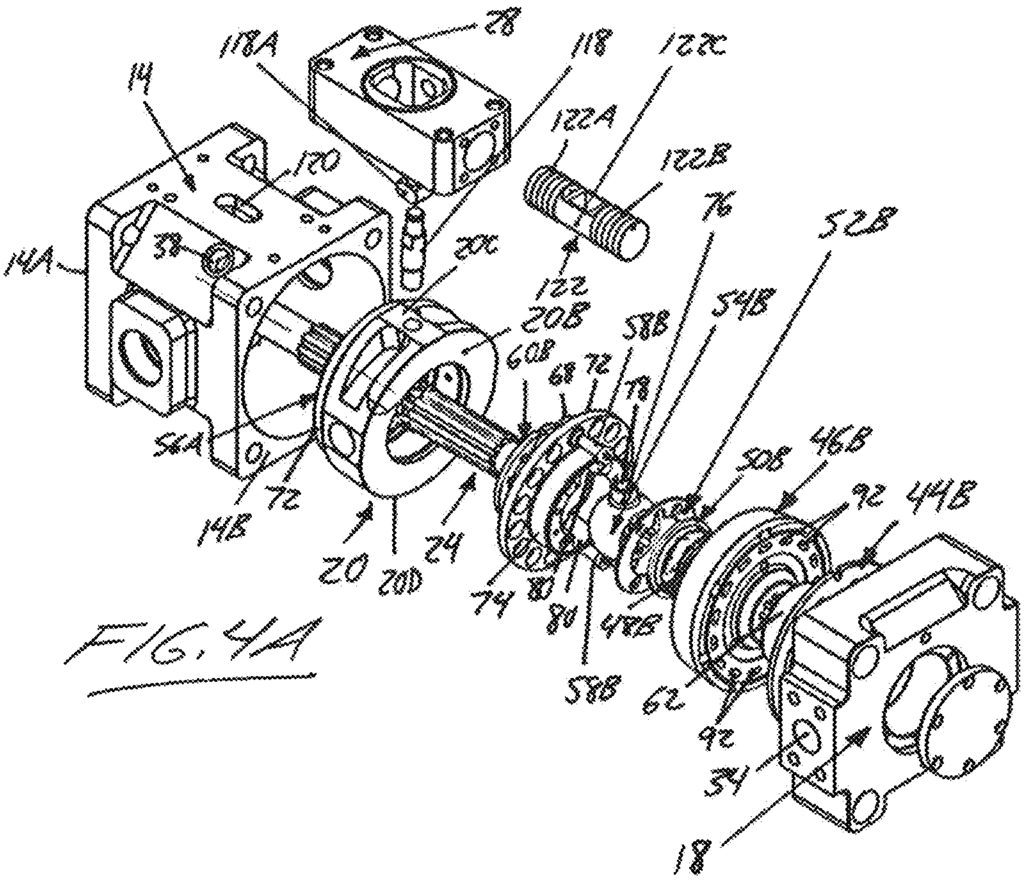
FIG. 4A is an exploded rear perspective view illustrating installation of a rear working section, a control assembly and a tapered swashplate into mid and rear housings of the pump, of which the tapered swashplate will be shared by a symmetrically matching front working section (substantially omitted to avoid overcrowding of the figure), once installed.
Figure 4B:
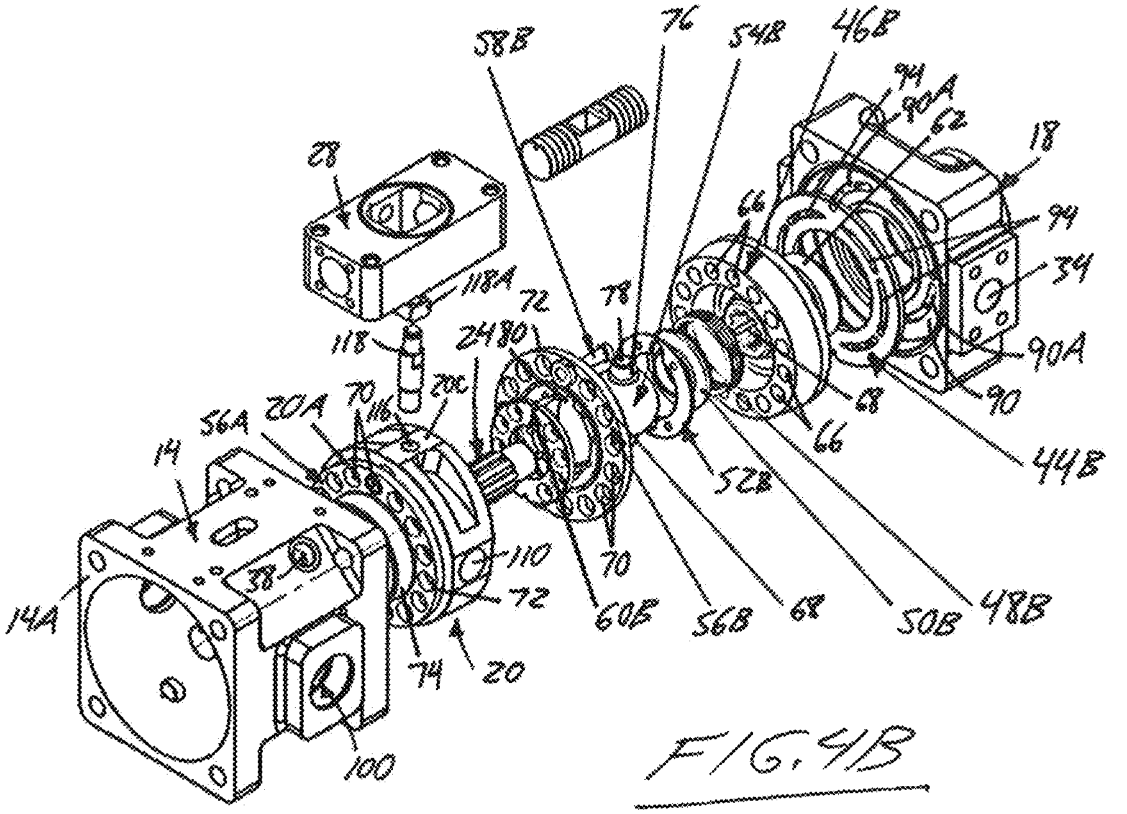
FIG. 4B is an exploded front perspective view of the same componentry shown in FIG. 4A.
Figure 4C:
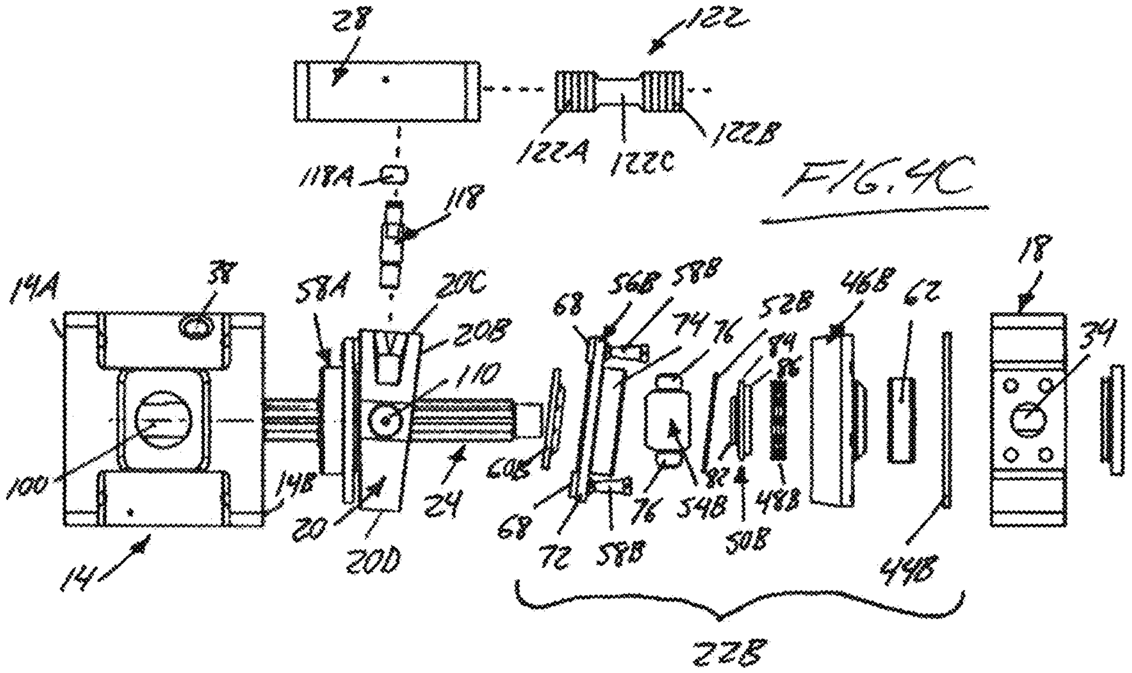
FIG. 4C is an exploded side elevational view of the same componentry shown in FIGS. 4A and 4B.

The front and rear working sections 22A, 22B are assembled from identical components to one another, installed in mirrored relationship to one another across the tapered swashplate 20. FIGS. 4A to 4C show exploded views of the rear working section 22B that is to be installed in a rear half of the mid-housing 14 in contained fashion between the swashplate 20 and the rear housing 18. The same description that follows of the rear working section likewise applies to the front working section 22A installed in the opposing front half of the mid-housing 14 between the swashplate 20 and the front housing 16, and so duplicated full description of the front working section's componentry is omitted in the interest of brevity.

With continued reference to FIGS. 4A to 4C, and moving from the rear housing 18 toward the swashplate 20, the rear working section 22B features a rear valve plate 44B, a rear barrel 46B, a rear wave spring 48B, a rear spring holder 50B, a rear piston holder lid 52B, a rear ball pivot 54B, a rear piston holder 56B carrying a rear set of pistons (of which only a pair are shown at 58B to avoid overcrowding of the figure and obstruction of other componentry), and a rear spherical washer 60B. The front pump section 22A features a matching set of pumping components: a front valve plate 44A, a front barrel 46A, a front wave spring 48A, a front spring holder 50A, a front piston holder lid 52A, a front ball pivot 54A, a front piston holder 56A carrying a front set of pistons 58A, and a front spherical washer 60A.

The rear pumping components 44B-60B are all disposed around a rear section of the driveshaft 24 that spans from the tapered swashplate 20 in the mid-housing 14 to the rear housing 18. Here, a central bore of the rear housing 18 houses a rear ball bearing 62 that receives and rotatably supports a terminal rear end 24B of the driveshaft 24. The front housing 16 similarly has a central bore penetrating axially therethrough, which there are housed one or more front ball bearings 64 (of which there are two in the illustrated example) that rotatably support a front section of the driveshaft 24 around which the front pumping components 44A-60A are disposed. The front and rear bearings 64, 62 thus rotatably support the driveshaft 24 inside the pump's main housing 12, while leaving the front end 24A of the driveshaft exposed outside the main housing for rotational coupling to the bidirectional drive motor (not shown). The rear housing 18 may include an SAE Type A ready coupling surface for optional mounting of an auxiliary pump with an SAE Type A mounting flange. While the illustrated example has the rear end 24B of the driveshaft 24 situated internally of the main housing 12 in the pump's fully assembled state, a through-shaft option where the rear end of the shaft protrudes externally of the housing like the front end 24A may alternatively be employed.

The rear barrel 46B has a circular array of cylinder bores 66 that penetrate into an annular swashplate-facing front face of the rear barrel 46B at equal angular intervals to one another around the longitudinal axis 26 of the driveshaft 24. A central through-bore 68 of the rear barrel 46B is splined, and mates with a splined region of the driveshaft's rear section, whereby the rear barrel 46B is rotationally locked to the driveshaft 24 for driven rotation therewith under operation of the bidirectional drive motor 150 in either direction. The number of pistons in the rear piston set 58B matches the quantity of cylinder bores 66 in the rear barrel 46B, and a rear working end of each rear piston 58B is slidably received in a respective one the cylinder bores 66 for back-and-forth displacement therein. A front actuation end of each rear piston 58 points toward the tapered swashplate 20, and is received in a respective piston shoe 68. Each piston shoe 68 is mounted in a respective aperture 70 found among a circular array of such apertures 70 provided in an annular outer flange 72 of the rear piston holder 56B. The quantity of apertures 70, and the angular spacing thereof around the annular outer flange 72, match the quantity and angular spacing of the cylinder bores 66 in the rear barrel 46B. Each piston shoe 68 has an enlarged base that exceeds a diameter of the respective aperture 70 and is disposed on the swashplate-facing side of the piston holder's outer flange 72, whereby the base is constrained to this swashplate-facing side of the piston holder 56. The base of each piston shoe 68 is in slidably interfacing contact with the annular face 20B of the tapered swashplate 20. The piston shoes of the rear piston set 58B thus ride on the rear face 20B of the tapered swashplate 20, and the piston shoes of the front piston set 58A similarly ride on the opposing front face 20A of the tapered swashplate 20.

Unlike the barrel 46B, the piston holder 56B is not directly splined or keyed to the driveshaft 24. This is because, unlike the piston holder that maintains a fixed orientation relative to the driveshaft 24, the piston holder 56B must be able to tilt back and forth relative to the driveshaft 24 in unison with the tapered swashplate 20 during tilted adjustment thereof to set the desired working position and corresponding split displacement ratio. To allow this, the piston holder 56B is indirectly mounted on the driveshaft 24 by way of the ball pivot 54, which in turn is rotationally interlocked to the driveshaft 24, for example by a splined axial through-bore of the ball pivot 54B, which like that of the barrel 46B, is engaged in mating fashion with the splined region of the driveshaft's rear section to achieve rotational interlock between the driveshaft 24 and the ball pivot 54B. The ball pivot 54B has a spherically convex exterior, which slidably conforms with a spherically concave inner rim of the spherical washer 60B to enable sliding interface between these spherically contoured surfaces. The spherical washer 60B is fastened to the swashplate facing side of the piston holder 56B, in a position residing radially inward from the outer flange 72 thereof. The washer 60B not only slidably interfaces with the ball pivot 54, but also retains the ball pivot 54 within a center bore of the piston holder 56*b* by blocking displacement of the ball pivot 54B out of the swashplate adjacent end of the piston holder's center bore.

A cylindrical hub 74 of the piston holder 56B projects axially from the outer flange 72 at the swashplate opposing side thereof opposite the spherical washer 60. This hub 74 delimits the center bore of the piston holder in which the ball pivot 54 resides. As mentioned above, the piston holder 56B must be free to tilt relative to the driveshaft 24, hence its lack of direct rotational fixation to the driveshaft 24 via splined or keyed intermating therewith. Yet the piston holder 56B must still rotate around the driveshaft's longitudinal axis 26 during driven rotation thereof. To this end, the ball pivot 54B feature a pair of spherical rollers 76 mounted on externally projecting studs 78 of the ball pivot 54B. These studs lie in diametrically opposing relation to one another across the driveshaft, and more particularly at twelve o'clock and six o'clock positions at the top and bottom of the ball pivot 54B in the illustrated embodiment, in order to match the twelve-to-six orientation of the swashplate's taper axis.

The hub 74 of the piston holder 56B, at matching twelve and six o'clock positions to the spherical rollers 76 of the ball pivot 54, has a pair of cylindrically-walled channels 80 that run axially through the hub 74 and are open to the center bore of the piston holder. The studs 78 of the ball pivot 54B reach into the channels 80 of the piston holder hub 74 to support the spherical rollers 76 therein. The concavely cylindrical walls of the channels 80 and the convexly spherical surfaces of the spherical rollers 76 share a matching radius of curvature, and thereby cooperatively block relative rotation between the piston holder 56B and the ball pivot 54B around the driveshaft's longitudinal axis 26, while allowing the piston holder 56B to tilt relative to the driveshaft 24 in concert with the tapered swashplate 20 during tiltable adjustment of the working position thereof. The hub 74 of the piston holder 56B also has axially oriented fastening holes therein at the swashplate-opposing side of the piston holder 56B, specifically at areas thereof situated between the two axial channels 80, whereby these fastening holes accommodate fastened securement of the piston holder lid 52B, which at least partially closes off the swashplate opposing ends of the two channels 80.

The spring holder 50B has an innermost hub 82 that spans around the driveshaft 24 between the barrel 46B and the piston holder 56B. This hub 82 is of lesser diameter than both the ball pivot 54B and the hub 74 of the piston holder 56B. A swashplate facing end of the spring holder hub 82 abuts against a swashplate opposing annular end of the ball pivot 54B at the swashplate opposing side of the piston holder 56B. An outer flange 84 of the spring holder 50B radiates outward from the hub 82 thereof at a swashplate opposing end thereof, and the wave spring 48B is sandwiched between this outer flange 84 of the spring holder 50B and a swashplate facing side of the barrel 46. The wave spring 48 encircles a spring positioning ring 86 of the spring holder 50B that protrudes axially from the swashplate opposing side of the outer flange 84.

The spring holder 50*b* and the wave spring 48B cooperate as a torque link to connect and synchronize rotation of the piston holder 56B and the barrel 46B, while allowing this torque link 48B, 50B and the barrel 46B to slide along the shaft, with spring 48B urging the ball pivot 54B and the barrel 46B away from one another, thus biasing the piston holder 56B toward the tapered swashplate 20 to maintain sliding contact of the piston shoes 68 with the swashplate's annular face 20B, and biasing the barrel 46B toward the rear housing 18 to maintain sufficiently pressured contact of the barrel's swashplate opposing side with the valve plate 44B. The valve plate 44B is received in a counterbored annulus 90 that is provided in the rear housing's swashplate facing side, and surrounds the bearing-containing center bore of the rear housing 18.

In the barrel 46B, each cylinder bore 66 that axially penetrates the annular swashplate-facing front face of the barrel 46B opens into a narrower fluid channel 92 that continues axially onward from the cylinder bore 66 and penetrates the swashplate opposing rear face 94 of the barrel 46B. The annular valve plate 44B is sandwiched between this swashplate opposing rear face of the barrel 46B and the counterbore annulus 90 of the rear housing 18. The valve plate 44B has a series of arcuate openings 94 therein at a matching radial distance from the driveshaft's longitudinal axis 26 as the fluid channels 92 of the barrel 46B.

The forgoing structural, positional and operational descriptions given above for the rear pumping componentry 44B-60B is also accurate for the front pumping componentry 44A-60A, except for the reversal of the front/rear directional references concerning the placement and orientation of the components. So, whereas the "swashplate facing" and "swashplate opposing" sides of the rear pumping componentry refer to front and rear sides thereof, respectively, they would instead refer to rear and front sides, respectively, of the front pumping componentry.

Figure 5:
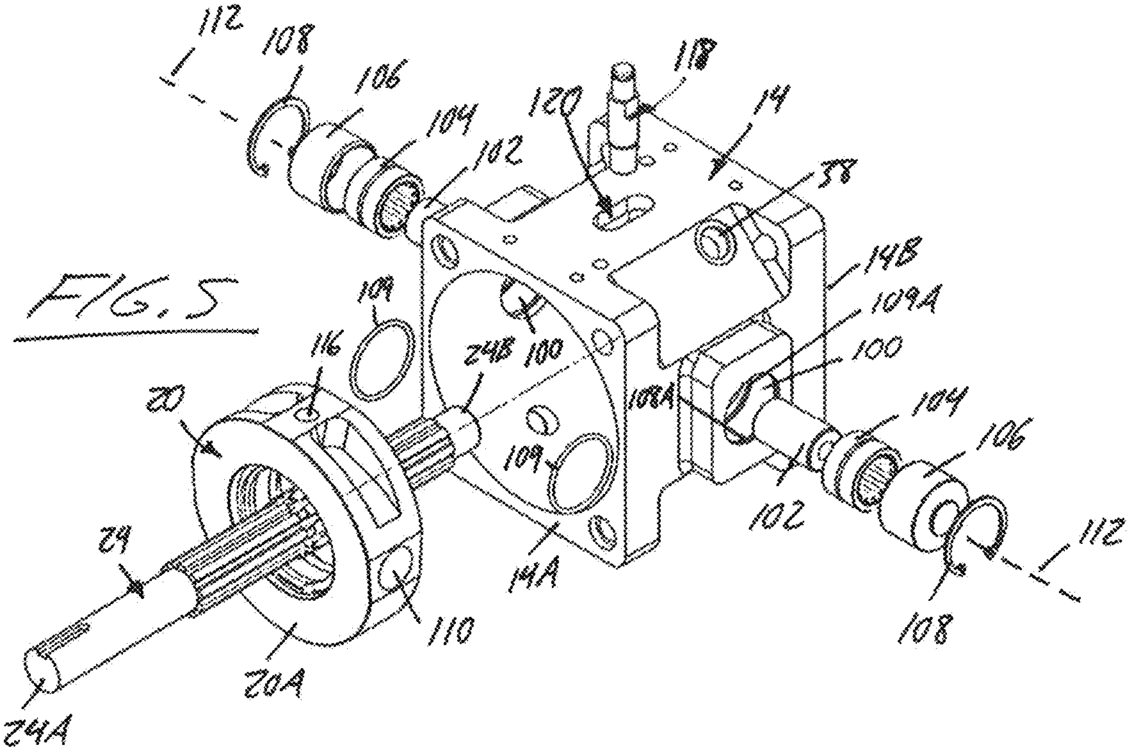
FIG. 5 is an exploded front perspective view of the mid-housing, illustrating more detailed installation of the swashplate in the mid-housing using an accompanying trunnion assembly to pivotably support the swashplate in a tiltable manner inside the mid-housing.

FIG. 5 illustrates installation of a trunnion assembly for pivotably supporting the swashplate inside the mid-housing 14. This trunnion assembly thereby defines the tilt axis about which the tapered swashplate 20 is tiltable to adjust the working position thereof. The mid-housing 14 has a pair of mounting bores 100 that penetrate through side walls of the mid-housing at opposing lateral sides thereof. Thee bores 100 penetrate into the mid-housing's cylindrical interior space, inside of which the tapered swashplate 20 and front and rear pumping components are installed. The mounting bores 100 are situated at an approximate midpoint of the mid-housing's axial length, midway between the mid-housings front and rear ends 14A, 14B, such that the swashplate 20 is pivotally supported at this axial midpoint of the mid-housing 14 when installed.

The trunnion assembly is composed of two identical subassemblies, each mounted in a respective one of the mid-housing's two mounting bores 100. Each subassembly features a pivot pin 102, a needle bearing 104, a bearing housing 106, a retaining ring 108 and an O-ring 109. The pivot pin 102, needle bearing 104, and bearing housing 106 reside concentrically of one another within the mounting bore 100, with the pivot pin 102 received within the needle bearing, which in turn is housed within the bearing housing 106. The bearing housing 106 is cup-shaped so as to both line the wall of the mounting bore 100 and cap off the outer end of the needle bearing 104 to prevent exposure thereof to the external environment outside the mounting bore 100. The retaining ring 108 snaps into an annular groove 108A in the mounting bore wall near the outer end thereof, and thereby retains the subassembly within the mounting bore 100. The O-ring 109 fits in another annular groove 109A in the mounting bore wall closer to the inner end thereof to provide a seal between the bearing housing 106 and the sidewall of the mid-housing 14.

The tapered swashplate 20 has a pair of cylindrical pin cavities 110 therein at diametrically opposing positions on opposing lateral sides of the tapered swashplate 20. These pin cavities 110 respectively align with the two mounting bores 100 of the mid-housing 14, and each pin cavity 110 receives an inner end of the pivot pin 102 of the respective trunnion subassembly. Via rotation of the pivot pins 102 within their respective needle bearings 104, the swashplate 20 is therefore pivotable about the coincident axes of the aligned pivot pins 102, which thereby define the tilt axis 112 about which the swashplate 20 is tiltable to adjust the working position thereof. This tilt axis 112 is perpendicular to both the driveshaft's longitudinal axis 26, and the taper axis of the swashplate. To allow the driveshaft 24 to rotate around its longitudinal axis 26 relative to the swashplate 20, and also allow the swashplate 20 to tilt relative to the driveshaft 24 about the tilt axis 112, a self-aligning ball bearing 114 is fitted between the driveshaft 24 and the tapered swashplate 20 inside a central void of the ring-shaped swashplate 20, and is retained therein by a set of retaining rings engaged externally to the driveshaft 24 and internally to the swashplate 20 in snap-fit relation thereto.

Having described assembly and installation of the swashplate 20 and pumping componentry, attention is now turned to details of a control assembly for controlling the tiltable adjustment of the tapered swashplate's working position. The swashplate 20, at the wide top end 20C thereof has a control bore 116 penetrating radially thereinto at a position and orientation of coincident relation to the taper axis. This control bore 116 receives a bottom working end of a control lever 118 that radiates outward from the swashplate in parallel and aligned relation to the taper axis, and passes through a control slot 120 in a top wall of the pump's mid-housing 14. This control slot 120 is elongated in the axial direction of the pump housing, and thus runs parallel to the driveshaft 24 at a twelve o-clock position aligned thereover. The control housing 28 is mounted to the same top wall of the pump's mid-housing 14 in overlying and enclosing relation to the control slot 120. The control lever 118 penetrates through the top wall of the mid-housing 14 via the control slot 120 and into the separate interior of the over-mounted control housing 28. The interior of the control housing, at least at end portions thereof spanning forwardly and rearwardly from the ends of the control slot 120 to respective ends of the control housing, is cylindrically shaped, with the axis of such cylindrical shape lying in the axial direction of the pump housing (i.e. parallel to the driveshaft 24 and the control slot 120). Slidably disposed within the interior of the control housing 28 is an axially elongated control shuttle 122 having a front piston body 122A nearest the front end of the control housing 28, a rear piston body 122B nearest the rear end of the control housing 28, and a midbody 122C spanning between the piston bodies in overlying relation to the control slot 120. An overall axial length of the control shuttle 122 is less than the overall axial length of the control housing interior, whereby a gap space can be accommodated between each piston body and the respective nearest end the control housing interior to allow back and forth axial movement of the shuttle 122 within the confines of the control housing 28

The midbody 122C of the control shuttle 122 has a cavity therein, and this cavity receives a top control end of the control lever 118, which is shown fitted with a roller block 118A for a snug but tiltable fitting of the control lever 118 with the shuttle's midbody cavity. Back and forth displacement of the control shuttle 122 in the control housing 28 is thus operable to tilt the swashplate 20 back and forth about the tilt axis 112 via the control lever 118, thereby adjusting the swashplate's working position. The illustrated embodiment includes front and rear adjustment screws 124A, 124B that respectively penetrate the front and rear ends of the control housing 122 via threaded fittings 126A, 126B on the end walls of the control housing. Rotation of each adjustment screw 124A, 124B is operable to adjust how far the screw protrudes axially into the control housing interior. Adjustment of the two screws 124A, 124B into positions respectively abutting the front and rear piston bodies 122A, 122B of the control shuttle 122 is operable to fix the control shuttle 122 in a given position within the control housing interior, and thereby fix the swashplate 20 at a given working position inside the mid-housing 14 of the pump 10. To change the working position of the swashplate 20, an operator would rotate a first one the two screws 124A, 124B in a retracting direction withdrawing more of that screw from the control housing 28, and then rotate the second screw in an advancing direction moving further into the control housing to tighten the control shuttle 122 against the retracted first screw. Repeated adjustment can be performed as necessary until a desired working position of the swashplate 20 is achieved.

On the other hand, the inclusion of the control shuttle 122, whose piston bodies 12AA, 122B present piston faces at opposing ends of the shuttle 122, also enables optional hydraulic control over the swashplate's working position, where one could connect hydraulic hoses to opposing ends of the control housing 28 and use hydraulic fluid to adjust the control shuttle position and corresponding swashplate working position. While the illustrated embodiment has a multi-modal control solution allowing either mechanical or hydraulic control over the swashplate working position, other embodiments may deviate from this multi-modal control assembly, and for example employ a single-mode mechanical, electro-mechanical or hydraulic control assembly instead.

Figure 10:
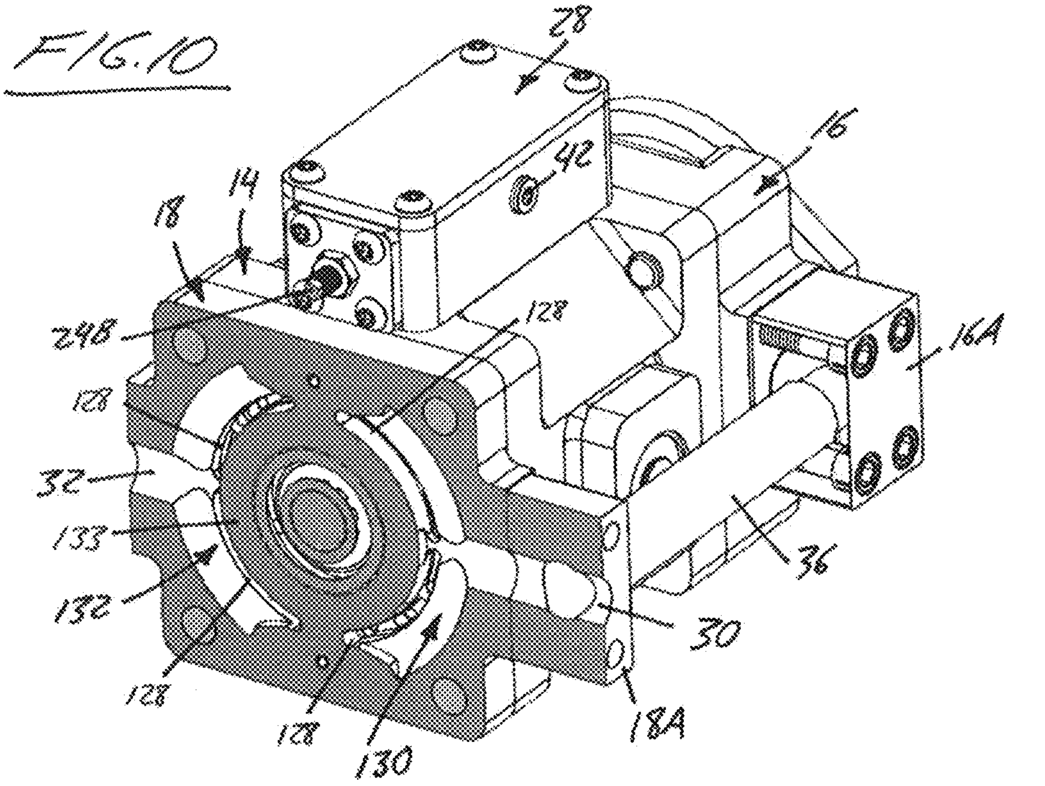
FIG. 10 is a cross sectional view of the novel pump as taken alone line X-X of FIG. 2A.

Having described the pumping componentry of the two working sections 22, 22B, the tapered swashplate 20 shared therebetween, and the control componentry for tilted adjustment of the swashplate's working position, attention is turned to routing of fluid through the pump during operation thereof. FIG. 10 shows the pump in radial cross-section at the rear housing 18 in a radial plane lying normally of the longitudinal axis 26 at flow ports 30 and 32, and just behind the counterbored annulus 90 in which the rear valve plate 44B is seated. Arcuate slots 128 in the floor of the rear housing's counterbored annulus 90 align with the arcuate openings 94 in the rear valve plate 44B to communicate with the fluid channels 92 of the rear barrel 46A. The slots 128 also penetrate through the counterbored annulus floor into a pair of arcuate fluid chambers 130, 132 in the rear housing 18. Each fluid chamber 130, 132 occupies, but spans slightly less than, a respective semi-circular half of a circular path around the longitudinal axis 26. From the viewing perspective of FIG. 10, fluid chamber 130 spans a roughly one o'clock to 5 o'clock range of this circular path, and fluid chamber 132 spans a roughly seven o'clock to eleven o'clock range thereof. Intact solid regions of the rear housing 18 separate the two fluid chambers 130, 132 from one another. These intact solid regions include a cylindrical inner ring 133 of the rear housing 18 that encircles and delimits the central bore of the rear housing in which the rear ball bearing 62 is contained. Flow port 30 of the rear housing 18 branches radially off of fluid chamber 130 at one lateral side of the rear housing 18, and flow port 32 branches radially off of fluid chamber 132 at the opposing lateral side of the rear housing 18 in diametric opposition to flow port 30.

Figure 11:
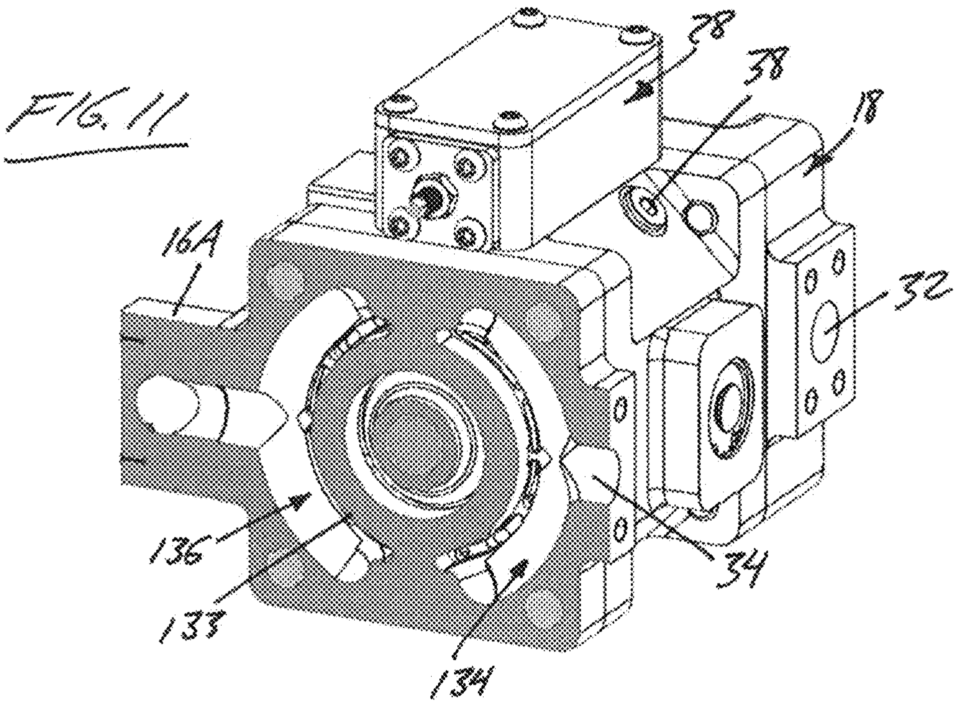
FIG. 11 is a cross sectional view of the novel pump as taken alone line Y-Y of FIG. 2A.

FIG. 11 similarly shows the pump in radial cross-section at the front housing 16 in a radial plane lying normally of the longitudinal axis 26 at flow port 34, and just behind a counterbored annulus of front housing 16 in which the front valve plate 44A is seated, just like the seating of the rear valve plate 44B in the counterbored annulus of the rear housing 18. At the front housing 16, arcuate slots 128 in the floor of the counterbored annulus once again align with the arcuate openings 94 in the valve plate 44A to communicate with the fluid channels 92 of the front barrel 46A. Once again, the arcuate slots 128 penetrate through the counterbored annulus floor into to a pair of arcuate fluid chambers 134, 136 in the front housing 16. Like those of the rear housing 18, these fluid chambers 134, 136 each occupy, but span slightly less than, a respective semi-circular half of a circular path around the longitudinal axis 26. Fluid chamber 134 of the front housing 16 aligns with fluid chamber 132 of the rear housing, and fluid chamber 136 of the front housing 16 aligns with fluid chamber 130 of the rear housing. Like at the rear housing 18, intact solid regions of the front housing 16 separate from the two fluid chambers 134, 136 from one another, and include among them a cylindrical inner ring 133 of the front housing 16 that encircles and delimits the central bore of the front housing in which the front ball bearings 64 are contained. Flow port 34 branches radially off of fluid chamber 134 at one lateral side of front housing 16. At the opposing lateral side of the front housing, in diametric opposition to flow port 34, externally piped conduit 36 communicates with fluid chamber 136 through shoulder block 16A such that both fluid chamber 136 of the front housing 16 and fluid chamber 130 of the rear housing 18 fluidly communicate with shared common flow port 30.

In any working position of the tapered swashplate 20 in which neither of the facial planes $P_F$, $P_R$ of the annular faces 20A, 20B are lying perpendicular to the longitudinal axis 26, each working section is operable to pump fluid during driven rotation of the driveshaft 24, owing to reciprocating displacement of the respective piston set 58A, 58B in the cylinder bores 66 of the respective barrel 46A, 46B as the piston holder 56A, 56B and barrel 46A, 46B revolve around the longitudinal axis 26, during which the piston shoes 68 ride in slidingly contacted interface with the annular faces 20A, 20B of the swashplate 20, whose obliquely inclined orientations relative to the longitudinal axis 26 cause the reciprocating displacement of the pistons 58*a*, 58*b* as they revolve therearound. Each half of the revolutionary path around the longitudinal axis, starting and ending at twelve o'clock in the illustrated example (since the thickest part of the tapered swashplate and corresponding top dead center of the piston stroke occur at twelve o'clock), correlates to either a suction half of the pumping cycle, during which the piston retracts (from top dead center) toward the midplane of the swashplate and thereby expands the working chamber volume inside the respective cylinder bore 66, or a pumping half of the cycle, during which the piston advances (toward top dead center) away from the midplane of the swashplate and thereby reduces the working chamber volume inside the respective cylinder bore 66.

So, for a given direction of driveshaft rotation, where fluid chambers 130 and 136 of the rear and front housings correspond to the suction half of the cycle, common flow port 30 serves as a common suction port shared by both working sections to draw fluid into the cylinder bores of both working sections. Meanwhile, fluid chambers 132 and 134 of the rear and front housings 18, 16 each correspond to the pumping half of the cycle, and so they discharge fluid from their respective unshared flow ports 32, 34 at a summed collective displacement rate equal to the incoming flow through the common suction port 30. The ratio at which this collective displacement rate is split between the front and rear working sections and their unshared flow ports 32, 34 is the swashplate-dictated split displacement ratio mentioned above. In the opposing direction of driveshaft rotation, fluid chambers 130 and 136 of the rear and front housings 18, 16 correspond to the pumping half of the cycle, and common flow port 30 serves as a common discharge port through which fluid is expelled collectively from both working sections. Meanwhile, fluid chambers 132 and 134 of the rear and front housings each correspond to the suction half of the cycle, and so they separately draw fluid into their respective working sections through unshared flow ports 32, 34, at the split displacement ratio governed by the swashplate position.

In further explanation of this swashplate dictated split displacement ratio, reference is made back to FIGS. 7A to 9B. FIGS. 7A and 7B show the tapered swashplate 200 set at its central non-tilted working position where it's midplane $P_M$ lies perpendicularly of the driveshaft's longitudinal axis 26. In the example of a 7-degree taper angle, each annular face 20A, 20B of the swashplate 20 resides at a 3.5-degree angle to the midplane $P_M$, and thus at a complimentary 86.5-degree angle to the longitudinal axis 26 in the central non-tilted position. The piston stroke length of the front and rear working sections 22A, 22B, and thus the ratio of split displacement between the unshared flow ports 32, 34 of the two working sections 22A, 22B, is dictated by the angles of the front and rear faces 20A, 20B of the tilt adjustable swashplate 20 relative to the longitudinal axis 26. So, in FIGS. 7A, and 7B the facial planes $P_F$, $P_R$ of the front and rear annular faces 20A, 20B are obliquely inclined relative to the longitudinal axis 26 at equal inclination angles of 86.5-degrees, and so the split displacement ratio between the two working sections is at an even 50:50 split. Both working sections contribute equal pumping action, and flow via common port 30 is split among front housing fluid chamber 136 and rear housing fluid chamber 130.

FIGS. 8A and 8B show the swashplate 20 repositioned from the central non-tilted position into a front-tilted working position, where the wider top end 20C of the swashplate has been tilted toward the front end of the pump, and the swashplate midplane $P_M$ is now obliquely oriented relative to the longitudinal axis 26, and inclined toward the front end of the pump. This forward tilting of the swashplate 20 decreases the relative angle of the facial plane $P_F$ of the swashplate's front annular face 20A to the longitudinal axis 26, and increases the relative angle of the facial plane $P_R$ of the swashplate's rear annular face 20B to the longitudinal axis 26. More specifically, FIGS. 8A and 8B show the swashplate 20 in a fully front-tilted position, denoting a first end of a normal operational range of the swashplate's tilt adjustment, in which the relative angle of the rear facial plane $P_R$ of the swashplate to the longitudinal axis 26 has reached 90-degrees, thus placing the annular rear face 20B of the swashplate perpendicular to the longitudinal axis 26. This has the effect of reducing the rear working section's piston stroke length to zero, whereby the split displacement ratio of the front working section 20A to the rear working section 20B is now 100:0. In this state, the rear working section contributes no pumping action at all, with all fluid flow via common port 30 being via front housing fluid chamber 136, and not rear housing fluid chamber 130. Adjustment of the swashplate 20 to intermediately front-tilted working positions between the central non-tilted working position of FIGS. 7A & 7B and the fully front-tilted working position of FIGS. 8A & 8B is operable to vary the split displacement ratio to any value between 50:50 and 100:0 (front to rear).

FIGS. 9A and 9B show the swashplate 20 repositioned from the central non-tilted position into a rear-tilted working position, where the wider top end 20C of the swashplate has been tilted toward the rear end of the pump, which decreases the relative angle of the facial plane $P_R$ of the swashplate's rear annular face 20B to the longitudinal axis 26, and increases the relative angle of the facial plane $P_F$ of the swashplate's front annular face 20B to the longitudinal axis 26. More specifically, FIGS. 8A and 8B show the swashplate 20 in a fully rear-tilted position, denoting a second end of the normal operational range of the swashplate's tilt adjustment, in which the relative angle of the front facial plane $P_R$ of the swashplate to the longitudinal axis 26 has reached 90-degrees, thus placing the front annular face 20A of the swashplate perpendicular to the longitudinal axis 26. This has the effect of reducing the front working section's piston stroke length to zero, whereby the split displacement ratio of the front working section 20A to the rear working section 20B is 0:100. In this state, the front working section contributes no pumping action at all, with all fluid flow via common port 30 being via rear housing fluid chamber 130, and not front housing fluid chamber 136. Adjustment of the swashplate to intermediately rear-tilted working positions between the central non-tilted working position of FIGS. 7A & 7B and the fully rear-tilted working position of FIGS. 9A & 9B is operable to vary the split displacement ratio to any value between 50:50 and 100:0 (rear to front).

Figure 12:
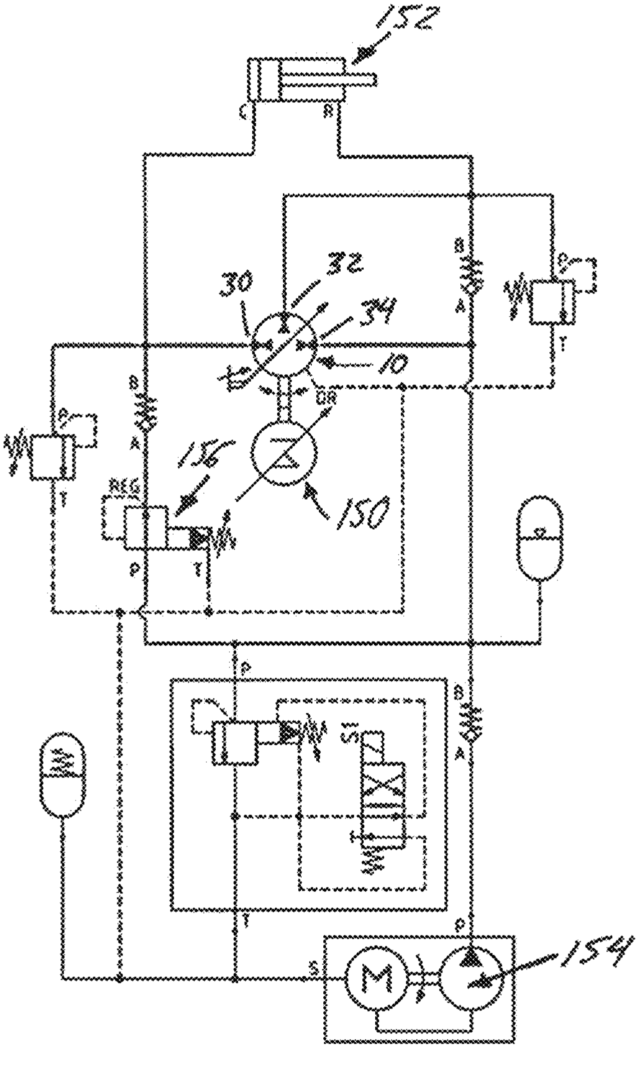
FIG. 12 is a schematic illustrating one possible implementation of a hydraulic circuit employing the inventive pump to drive a single rod hydraulic cylinder.

FIG. 12 schematically illustrates one implemented use of the pump 10, driven by a bidirectional motor 150 coupled to driveshaft 24, in a closed hydraulic circuit for operating a single rod hydraulic cylinder 152. Shared common port 30 is connected to the cap end of the hydraulic cylinder 202, a selected either one of the unshared ports 32 or 34 is connected to the rod end of the hydraulic cylinder 152, and the other one of the unshared ports 34 or 32 is connected to a charge/boost line of the circuit that is fed by a separate charge pump 154. This setup enables double the flow to the cap end of the hydraulic cylinder 152 relative to the rod end thereof, and thus may be particularly useful for larger hydraulic cylinders.

It is noted that illustrated valve 156 may be required for large hydraulic cylinders having cap-side to piston-side surface area ratios of 2:1 and higher for better balancing of forces. For hydraulic cylinders having surface area ratios closer to unity (1:1), valve 156 may not be required. It will also be appreciated the implementation illustrated in FIG. 12 is presented only as a non-limiting example of one possible application for the novel, versatile and flexible pump 10 of the present invention, which may have many other possible uses.

Referring back to FIG. 5, assembly of pump starts with installation of the shared central swashplate 20, preassembled with its self-aligning ball bearing 114, into the mid-housing 14. Once the swashplate 20 is properly centered in alignment with the mounting bores 100, the trunnion components are pressed into the mounting bores 100, with the associated O-rings 109 for leakage prevention, and are secured with the snap-in retaining rings 108. The control lever 118 is then engaged (e.g. screwed in) to the control bore 116 in the top of the swashplate 20, through the control slot 120 in the top of the mid-housing 14. After such installation of the swashplate 20, further assembly is simply a matter of sliding in all the working section componentry on either side of the shared swashplate 20, and installing the front and rear housings 16, 18 on the mid-housing 14 to cap off the front and rear ends thereof.

As outlined above, tilting of the swashplate in either direction from its central non-tilted position shifts one working section toward its maximum displacement, and the other working section toward its minimum displacement. Accordingly, in preparation for use with a particular hydraulic cylinder having a known area ratio, the working position of the swashplate, and the associated split displacement ratio corresponding thereto, are adjusted and tuned for that particular hydraulic cylinder's area ratio. On set at the suitable split displacement ratio, the pump is now specifically matched to that particular cylinder, and ready for use. While the illustrated embodiment enables tilted adjustment of the swashplate in both forward and rearward directions, it will be appreciated that this may not be necessary in practice, where tiltable adjustment in one direction, plus the ability to select which of the two unshared section-specific ports 32, 34 to use for a particular connection, is sufficient to enable a full-range of split displacement ratios.

In summary of novel benefits and features of the preferred embodiment detailed above and illustrated in the accompanying figures, the three-port variable split displacement ratio pump does not require any type of directional valves between the pump 10 and the hydraulic cylinder 152, is ideally able to produce simultaneous flow of variable ratio between two ports, and can be adjusted to an infinite number of possible flow ratios (at least in the illustrated example, where screw or hydraulic based control means continuous adjustability throughout the full working range of the tilt adjustable swashplate—though less preferable embodiments may have less precise control implementations, for example with discretely indexed control of the swashplate position). Furthermore, the pump is ideally capable of producing smooth flow at any given split displacement ratio, and ensuring smooth flow at low rotational speed of the pump. The bi-rotational pump is easy to setup, use and adjust to accommodate different hydraulic cylinder sizes, can optionally be configured in a through-shaft setup.

The detailed embodiment described above is characterized as a pump, whose design is particularly useful for operation of a single rod hydraulic cylinder to address the shortcomings of the prior art efforts in such context, but the same machine, in its identical form, or with slight modification or variation, can also be used in other contexts and for other purposes. The identical machine can be used as a flow divider or flow combiner. In use as a flow divider, the shared common port 30 serves as an inlet for receiving a source flow of incoming hydraulic fluid that is split by the working sections into two separate output flows that are outputted through the unshared ports 32, 34 at a split ratio dictated by the swashplate's working angle. In use as a flow combiner, the two unshared ports 32, 34 serve as inlets through which two separate source flows are respectively received by the two working sections, and combined into a singular output flow that outputted through the shared common port 30. In another variant, the sharing of a common port 30 between the two working sections is omitted, for example by removal of the piped conduit 36, so that the two working sections have two dedicated (unshared) ports each, whereby the machine can be used as a rotary type variable pressure intensifier, in which a variable pressure intensification imparted on incoming fluid by each of the two working sections is dictated by the swashplate's working angle.

Since various modifications can be made in the above-disclosed invention, and many apparently widely different embodiments of same made, it is intended that all matter contained in the accompanying specification shall be interpreted as illustrative only and not in a limiting sense.

The invention claimed is:

1. A variable split displacement ratio axial piston machine comprising:

a singular driveshaft supported for rotation about a longitudinal axis thereof that lies axially of the machine;

a tapered swashplate disposed around said singular driveshaft in a state of rotationally-unfixed relation thereto in which the singular driveshaft is rotatable relative to said tapered swashplate about the longitudinal axis, said tapered swashplate having first and second outer faces that face in axially opposing directions along the longitudinal axis in facial planes of non-parallel relation to one another that are separated by an acutely oblique taper angle measured between said first and second outer faces, the tapered swashplate being adjustably tiltable into different working positions of varying orientation relative to the longitudinal axis of the singular driveshaft;

a first working section that is disposed on a first side of the tapered swashplate of corresponding relation to said first outer face thereof, and comprises a first set of pistons slidably received in a first set of cylinder bores in which said first set of pistons are displaceable back and forth to draw and expel fluid into and from said first set of cylinder bores, said first set of cylinder bores being rotationally locked to the singular driveshaft to revolve around the longitudinal axis under driven rotation of the singular driveshaft; and a second working section disposed on a second side of the tapered swashplate of corresponding relation to said second outer face thereof, and comprising a second set of pistons slidably received in a second set of cylinder bores in which said second set of pistons are displaceable back and forth to draw and expel fluid into and from said second of cylinder bores, said second set of cylinder bores also being rotationally locked to the singular driveshaft to revolve around the longitudinal axis during under driven rotation of the singular driveshaft;

wherein the first and second working sections respectively interface with the first and second outer faces of the tapered swashplate in respective first and second facial planes, and tiltable adjustment of the working position of the tapered swashplate is operable to adjust respective orientations of the first and second facial planes, said orientations of which dictate relative piston stroke lengths of the first and second piston sets, thereby imparting control over a variable split displacement ratio between said first and second working sections.

2. A variable split displacement ratio axial piston machine comprising:

a rotatable driveshaft supported for rotation about a longitudinal axis thereof that lies axially of the machine;

a tapered swashplate disposed around said rotatable driveshaft, said tapered swashplate having first and second outer faces that face in axially opposing directions along the longitudinal axis in facial planes of non-parallel relation to one another that are separated by an acutely oblique taper angle measured between said first and second outer faces, the tapered swashplate being adjustably tiltable into different working positions of varying orientation relative to the longitudinal axis of the rotatable driveshaft;

a first working section that is disposed on a first side of the tapered swashplate of corresponding relation to said first outer face thereof, and comprises a first set of pistons slidably received in a first set of cylinder bores in which said first set of pistons are displaceable back and forth to draw and expel fluid into and from said first set of cylinder bores; and a second working section disposed on a second side of the tapered swashplate of corresponding relation to said second outer face thereof, and comprising a second set of pistons slidably received in a second set of cylinder bores in which said second set of pistons are displaceable back and forth to draw and expel fluid into and from said first second of cylinder bores:

wherein:

the first and second working sections respectively interface with the first and second outer faces of the tapered swashplate in respective first and second facial planes, and tiltable adjustment of the working position of the tapered swashplate is operable to adjust respective orientations of the first and second facial planes, said orientations of which dictate relative piston stroke lengths of the first and second piston sets, thereby imparting control over a variable split displacement ratio between said first and second working sections;

the first working section comprises:

a first barrel that is mounted on the rotatable driveshaft for rotation therewith on said first side of the tapered swashplate, and that embodies the first set of cylinder bores; and a first piston holder disposed around the rotatable driveshaft at a position residing between the first rotatable barrel and the tapered swashplate on the first side thereof in adjacency to the first facial plane thereof, with the first set of pistons spanning from the first piston holder into the first set of cylinder bores; and the second working section comprises:

a second barrel that is mounted on the rotatable driveshaft for rotation therewith on said second side of the tapered swashplate, and that embodies the second set of cylinder bores;

a second piston holder disposed around the rotatable driveshaft at a position residing between the second rotatable barrel and the tapered swashplate on the second side thereof in adjacency to the second facial plane thereof, with the second set of pistons spanning from the second piston holder into the second set of cylinder bores.

3. The machine of claim 2 wherein said first and second piston holders are each tiltable relative to the rotatable driveshaft for tilting movement with the tapered swashplate during tiltable adjustment thereof between said different working positions.

4. The machine of claim 2 comprising a first spring residing between the first barrel and the first piston holder, and a second spring residing between the second barrel and the second piston holder.

5. The machine of claim 4 wherein the first and second barrels are slidable along the rotatable driveshaft, and the first and second springs force the first and second barrels and the first and second piston holders away from one another.

6. The machine of claim 4 wherein the first and second piston holders are respectively mounted on first and second ball pivots that allow tilting of said first and second piston holders with the tapered swashplate, and the first and second springs exert spring forces against said first and second ball pivots, respectively.

7. The machine of claim 2 wherein said first and second rotatable barrels are each mounted to the rotatable driveshaft in a non-tiltable manner to retain a fixed orientation relative thereto.

8. The machine of claim 1 wherein the tapered swashplate is supported on a pivot whose pivot axis lies transversely of the longitudinal axis of the singular driveshaft, and about which the swashplate is tiltable between said different working positions.

9. The machine of claim 1 comprising a control lever that radiates from the tapered swashplate for use in tiltable adjustment thereof between said different working positions.

10. The machine of claim 9 comprising a control shuttle positioned and operable to displace a control end of the control lever during said tiltable adjustment of the tapered swashplate.

11. The machine of claim 10 wherein said control shuttle is hydraulically actuatable to adjust the tapered swashplate between said different working positions via hydraulic control.

12. The machine of claim 10 further comprising a screw adjustment selectively operable to mechanically set the control shuttle in a selected position, and thereby mechanically set the tapered swashplate in a selected one of the different working positions.

13. A variable split displacement ratio axial piston machine comprising:

a rotatable driveshaft supported for rotation about a longitudinal axis thereof that lies axially of the machine;

a tapered swashplate disposed around said rotatable driveshaft, said tapered swashplate having first and second outer faces that face in axially opposing directions along the longitudinal axis in facial planes of non-parallel relation to one another that are separated by an acutely oblique taper angle measured between said first and second outer faces, the tapered swashplate being adjustably tiltable into different working positions of varying orientation relative to the longitudinal axis of the rotatable driveshaft;

a first working section that is disposed on a first side of the tapered swashplate of corresponding relation to said first outer face thereof, and comprises a first set of pistons slidably received in a first set of cylinder bores in which said first set of pistons are displaceable back and forth to draw and expel fluid into and from said first set of cylinder bores; and a second working section disposed on a second side of the tapered swashplate of corresponding relation to said second outer face thereof, and comprising a second set of pistons slidably received in a second set of cylinder bores in which said second set of pistons are displaceable back and forth to draw and expel fluid into and from said first second of cylinder bores;

wherein:

the first and second working sections respectively interface with the first and second outer faces of the tapered swashplate in respective first and second facial planes, and tiltable adjustment of the working position of the tapered swashplate is operable to adjust respective orientations of the first and second facial planes, said orientations of which dictate relative piston stroke lengths of the first and second piston sets, thereby imparting control over a variable split displacement ratio between said first and second working sections;

each set of cylinder bores follows a respective revolutionary path around the rotatable driveshaft during driven rotation thereof;

each said revolutionary path comprises a respective first half during which the respective set of pistons move in a first one of either a retracting chamber-expanding direction drawing fluid into the respective cylinder bores or an advancing chamber-reducing direction expelling fluid from the respective cylinder bores, and a second half during which the respective set of pistons move in a second one of either said retracting chamber-expanding direction or said advancing chamber-reducing direction;

a shared common flow port of the machine fluidly communicates with both sets of cylinder bores at the respective first halves of the revolutionary paths thereof;

a first unshared flow port of the machine fluidly communicates with the first set of cylinders at the second half of the revolutionary path thereof;

a second unshared flow port of the machine fluidly communicates with the second set of cylinders at the second half of the revolutionary path thereof; and tiltable adjustment of the working position of the tapered swashplate, by adjusting the respective orientations of the first and second facial planes to dictate the relative piston stroke lengths of the first and second piston sets, thereby sets a resulting split displacement ratio at which fluid is outputted from the first and second working sections by movement of the respective sets of pistons in the advancing chamber-reducing direction.

14. The machine of claim 13 in combination with a bidirectional motor coupled to the machine for bi-rotational operation thereof, whereby:

in a first driven direction of said bidirectional motor, the first halves of the revolutionary paths are suction halves during which the respective sets of pistons move in the retracting chamber-expanding direction, the second halves of the revolutionary paths are pumping halves during which the respective sets of pistons move in the advancing chamber-reducing direction, the shared common port serves as a common suction port drawing fluid into the machine, and the first and second unshared flow ports serve as separate discharge ports through which fluid is separately expelled from the working sections at the split displacement ratio; and in a second driven direction of said bidirectional motor, the first halves of the revolutionary paths are the pumping halves, the second halves of the revolutionary paths are the suction halves, the first and second unshared flow ports serve as separate suction ports through which fluid is drawn into the machine at the split displacement ratio, and the shared common port serves as a common discharge port through which fluid is expelled collectively from both working sections.

15. The machine of claim 1 wherein the first set of pistons reside between the first set of cylinders and the tapered swashplate, and the second set of pistons reside between the second set of cylinders and the tapered swashplate.

16. A variable split displacement ratio axial piston machine comprising:

a bi-directional motor:

a rotatable driveshaft supported for rotation about a longitudinal axis thereof that lies axially of the machine, and to which the bi-directional motor is coupled for bi-rotational operation of the machine via bi-rotational driving of said rotatable driveshaft;

a tapered swashplate disposed around said rotatable driveshaft, said tapered swashplate having first and second outer faces that face in axially opposing directions along the longitudinal axis in facial planes of non-parallel relation to one another that are separated by an acutely oblique taper angle measured between said first and second outer faces, the tapered swashplate being adjustably tiltable into different working positions of varying orientation relative to the longitudinal axis of the rotatable driveshaft;

a first working section that is disposed on a first side of the tapered swashplate of corresponding relation to said first outer face thereof, and comprises a first set of pistons slidably received in a first set of cylinder bores in which said first set of pistons are displaceable back and forth to draw and expel fluid into and from said first set of cylinder bores;

a second working section disposed on a second side of the tapered swashplate of corresponding relation to said second outer face thereof, and comprising a second set of pistons slidably received in a second set of cylinder bores in which said second set of pistons are displaceable back and forth to draw and expel fluid into and from said first second of cylinder bores;

wherein the first and second working sections respectively interface with the first and second outer faces of the tapered swashplate in respective first and second facial planes, and tiltable adjustment of the working position of the tapered swashplate is operable to adjust respective orientations of the first and second facial planes, said orientations of which dictate relative piston stroke lengths of the first and second piston sets, thereby imparting control over a variable split displacement ratio between said first and second working sections.

* * * * *